United States Patent
Radich et al.

(10) Patent No.: US 10,515,227 B2
(45) Date of Patent: Dec. 24, 2019

(54) ENCRYPTED COLLABORATION SYSTEM AND METHOD

(71) Applicant: PageProof.com Limited, Newmarket (NZ)

(72) Inventors: Marcus Radich, Milford (NZ); Braden Burton, Warkworth (NZ); Gemma Hurst, Northcote Point (NZ)

(73) Assignee: PageProof.com Limited, Auckland (NZ)

( * ) Notice: Subject to any disclaimer, the term of this patent is extended or adjusted under 35 U.S.C. 154(b) by 239 days.

(21) Appl. No.: 15/520,325

(22) PCT Filed: Oct. 23, 2015

(86) PCT No.: PCT/IB2015/058174
§ 371 (c)(1),
(2) Date: Apr. 19, 2017

(87) PCT Pub. No.: WO2016/063254
PCT Pub. Date: Apr. 28, 2016

(65) Prior Publication Data
US 2018/0012032 A1   Jan. 11, 2018

(30) Foreign Application Priority Data

Oct. 23, 2014  (NZ) ........................ 701329

(51) Int. Cl.
*G06F 21/62*   (2013.01)
*H04L 9/30*    (2006.01)
(Continued)

(52) U.S. Cl.
CPC ....... *G06F 21/6218* (2013.01); *G06Q 10/103* (2013.01); *H04L 9/0861* (2013.01);
(Continued)

(58) Field of Classification Search
CPC ... G06F 21/6218; G06F 21/62; H04L 63/045; H04L 9/0894; H04L 9/0891;
(Continued)

(56) References Cited

U.S. PATENT DOCUMENTS 8,732,462 B2   5/2014 Bhathena et al.
2012/0317414 A1  12/2012 Glover
(Continued)

FOREIGN PATENT DOCUMENTS

| AU | 2005202842 A1 | 1/2006 |
|----|---------------|--------|
| EP | 2680207       | 1/2014 |

(Continued)

OTHER PUBLICATIONS

"International Application No. PCT/IB2015/058174, International Search Report and Written Opinion dated Jan. 4, 2016", (Jan. 4, 2016), 10 pgs.

(Continued)

*Primary Examiner* — Ashokkumar B Patel
*Assistant Examiner* — Quazi Farooqui
(74) *Attorney, Agent, or Firm* — Schwegman Lundberg & Woessner, P.A.

(57) ABSTRACT

A method of sharing collaborative data between registered users in an online collaboration system. The collaboration system has a server and one or more electronic user devices that are capable of data communication with the server over a data network. Each registered user is allocated a unique asymmetric key pair comprising a user public key and a user private key for encryption and decryption of shared data content. The server is able to modify uploaded encrypted data content to enable access by multiple authorized users, and is able to convert uploaded data content into alternative formats, typically to enable web-browser viewing.

56 Claims, 13 Drawing Sheets

(51) Int. Cl.
*H04L 9/14* (2006.01)
*G06Q 10/10* (2012.01)
*H04L 9/08* (2006.01)
*H04L 29/06* (2006.01)

(52) U.S. Cl.
CPC .......... *H04L 9/0891* (2013.01); *H04L 9/0894* (2013.01); *H04L 9/14* (2013.01); *H04L 9/30* (2013.01); *H04L 63/045* (2013.01)

(58) Field of Classification Search
CPC . H04L 9/0861; H04L 9/14; H04L 9/30; H04L 9/08; G06Q 10/103; G06Q 10/10
USPC ........... 713/171, 150, 165, 166; 726/2, 6, 28
See application file for complete search history.

(56) References Cited

U.S. PATENT DOCUMENTS

2013/0007464 A1    1/2013   Madden
2013/0254536 A1    9/2013   Glover
2014/0032486 A1    1/2014   Sharma et al.

FOREIGN PATENT DOCUMENTS

| EP | 2704354 | 3/2014 |
|---|---|---|
| EP | 2779523 | 9/2014 |
| WO | WO-2001052473 | 7/2001 |
| WO | WO-2012144909 | 10/2012 |
| WO | WO-2013006296 | 1/2013 |
| WO | WO-2013157957 | 10/2013 |
| WO | WO-2016063254 | 4/2016 |

OTHER PUBLICATIONS

"European Application No. 15852378.7, Extended European Search Report dated Apr. 30, 2018", (Apr. 30, 2018), 8 pgs.

"European Application No. 15852378.7, Response to Extended European Search Report dated Nov. 20, 2018", (Nov. 20, 2018), 11 pgs.

"International Application No. PCT/IB2015/058174, International Preliminary Report on Patentability dated Apr. 25, 2017", (Apr. 25, 2017), 6 pgs.

ENCRYPTED COLLABORATION SYSTEM AND METHOD

PRIORITY CLAIM TO RELATED APPLICATIONS

This application is a U.S. national stage application filed under 35 U.S.C. § 371 from International Application Serial No. PCT/IB2015/058174, which was filed 23 Oct. 2015, and published as WO2016/063254 on 28 Apr. 2016, and which claims priority to New Zealand Application No. 701329, filed 23 Oct. 2014, which applications and publication are incorporated by reference as if reproduced herein and made a part hereof in their entirety, and the benefit of priority of each of which is claimed herein.

FIELD OF THE INVENTION

The invention relates to an encrypted online collaboration system and method. In particular, although not exclusively, the system and method is suited to providing for encrypted online electronic media content proofing and approval.

BACKGROUND TO THE INVENTION

Online collaboration is continuously becoming cheaper, faster, and easier to achieve. People at different physical locations can now collaborate online via shared workspaces which allow them to share content instantly with anyone as well as viewing and editing shared contents. An example of an online collaboration system is a document proofing and approval system which allows a group of document reviewers to each review and comment on a single document, before a final version can be agreed upon.

As these online collaboration systems become more and more popular, users become more accustomed to use such systems to share confidential and important data over the internet. The risk associated with sharing important data online is obvious—the communication can be eavesdropped during data transfer over public communication networks. The content can then be readily viewed by the intruder. Even if the data is stored on the server and not being transferred over public communication networks, the server may be hacked which means the data stored is at risk of being exposed and compromised.

To protect the data stored on a computer, cryptographic systems are developed to encrypt the data before it is stored. A cryptographic system protects data by encrypting it with a key. If the encryption algorithm is strong and the key is chosen carefully, then it is more difficult to recover the original data content without the key. The encrypted data can only be viewed by a user with the correct decryption key. Although such systems improve the security of data storage systems, it is not suitable and often cumbersome to use in a collaborative environment where data stored on the server needs to be accessed or viewed by a plurality of users as this requires the encryption and decryption keys to be distributed to all authorized users.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

SUMMARY OF THE INVENTION

It is an object of the invention to provide an online collaboration system which allows multiple users to securely upload and review data content in a collaborative manner with end-to-end encryption, or to at least provide the public with a useful choice.

In a first aspect, the invention broadly consists in a method of sharing collaborative data between registered users in an online collaboration system, the collaboration system comprising a server and one or more electronic user devices that are capable of data communication with the server over a data network, each registered user being allocated a unique asymmetric key pair comprising a user public key and a user private key for encryption and decryption, the method executed on the server by one or more processors comprising:
  receiving encrypted data at the server over the data network from a first user via an electronic user device operated by the first user, wherein the encrypted data has been encrypted on the electronic user device and comprises:
    encrypted data content generated by symmetric encryption of the data content with a data key, and
    an associated enveloped data key comprising encrypted versions of the data key generated by asymmetric encryption of the data key with the first user's public key and a server public key respectively;
  decrypting the enveloped data key associated with the encrypted data content on the server using a server private key, wherein the server private key and the server public key form an asymmetric key pair;
  generating a new or modified enveloped data key for the encrypted data content comprising asymmetrically encrypted versions of the data key generated by the first user's public key, the server public key, and one or more additional unique public keys of one or more additional authorized users that have granted access to the data content; and
  storing the new or modified enveloped data key with the encrypted data content in the server to thereby enable access to the data content by the first user and the one or more additional authorized users using their respective user private keys.

In an embodiment, the method further comprises: decrypting the encrypted data content using the decrypted data key; converting the decrypted data content into a different file format than its original file format; re-encrypting the converted data content using the decrypted data key or a new data key or keys; and storing the re-encrypted converted data content with an associated new or modified enveloped data key or keys on the server to enable access to the data content by the first user and the one or more additional authorized users using their respective user private keys.

In an embodiment, before the step of generating a new or modified enveloped data key, the method further comprises: re-encrypting the converted data content using a new data key or data keys, and wherein the generated new or modified enveloped data key or keys comprises asymmetrically encrypted versions of the new data key or keys with the first user's public key, the server public key, and the unique public keys of one or more additional authorized users that have granted access to the data content; and storing the re-encrypted converted data content with its associated new or modified enveloped data key or keys on the server to enable access to the data content by the first user and the one or more additional authorized users using their respective user private keys.

In an embodiment, converting the decrypted data content into a different file format than its original file format comprises generating more than one new converted files of a different format that collectively representing the original data content, and the method comprises: re-encrypting each of the new converted files with its own respective unique data key; generating new enveloped data keys for each of the respective encrypted new converted files using the first user's public key, the server public key, and the public keys of the one or more additional authorized users that have been granted access to the data content; and storing the re-encrypted new converted data files with their respective associated new enveloped data keys on the server to enable access to the data content by the first user and the one or more additional authorized users using their respective user private keys.

In an embodiment, the decrypted data content is a multi-page document file, and the method comprises converting the multi-page document file into a plurality of single-page document files of a different format.

In an embodiment, the method comprises converting the decrypted data content into a browser-viewable file format that allows for direct browser display on an electronic user device.

In an embodiment, the method comprises converting the decrypted data content into an image or text file format.

In an embodiment, the server comprises a main server platform that is in accessible data communication with the one or more electronic user devices over the data network, and one or more security private platforms that have a private data communication link to the main server platform, and wherein the one or more security private platforms retrieve the encrypted data from the main server platform and perform the steps of decrypting the encrypted data content, converting the encrypted data content into a different file format, re-encrypting the converted data content, and then transmitting the re-encrypted converted data content with its associated new or modified enveloped data key or keys back to the main server platform for storage.

In an embodiment, the server comprises a main server platform that is in accessible data communication with the one or more electronic user devices over the data network, and one or more security private platforms that have a private data communication link to the main server platform, and wherein the one or more security private platforms retrieve the encrypted data from the main server platform and perform the steps of decrypting the enveloped data key, generating the new or modified enveloped data key, and then transmitting the new or modified enveloped data key and encrypted data content back to the main server platform for storage.

In an embodiment, the one or more security private platforms unilaterally control the data communication with the main server platform in that the security private platforms are configured to initiate data communication with the main server platform by requesting data and sending processed data back to the main server platform.

In an embodiment, the method further comprising generating a service queue or queues on the main server platform comprising data identifying items of received encrypted data that require further processing, and monitoring of the one or more service queues by the one or more security private platforms to identify items of encrypted data to be retrieved from the main server platform for processing.

In an embodiment, the encrypted data content and associated enveloped data key or keys are stored on the main server platform.

In an embodiment, the encrypted data content comprises a data file or files comprising electronic media content for display or playback.

In an embodiment, the electronic media content comprises any one or more of the following: text, graphics, audio, and/or video.

In an embodiment, the encrypted data content comprises a digital comment or comments uploaded to the server by an authorized user relating to other encrypted data content the user has been granted access to.

In an embodiment, the digital comment is in the form of any of the following: text, audio, and/or video.

In a second aspect, the invention may broadly consist in a server for sharing collaboration data in an online collaboration system, the server being accessible for data communication by one or more electronic user devices over a data network, each registered user being allocated a unique asymmetric key pair comprising a user public key and a user private key for encryption and decryption, the server comprising one or more processors being configured to:
  receive encrypted data at the server over the data network from a first user via an electronic user device operated by the first user, wherein the encrypted data has been encrypted on the electronic user device and comprises:
    encrypted data content generated by symmetric encryption of the data content with a data key, and
    an associated enveloped data key comprising encrypted versions of the data key generated by asymmetric encryption of the data key with the first user's public key and a server public key respectively,
  decrypt the enveloped data key associated with the encrypted data content on the server using a server private key, wherein the server private key and the server public key form an asymmetric key pair;
  generate a new or modified enveloped data key for the encrypted data content comprising asymmetrically encrypted versions of the data key generated by the first user's public key, the server public key, and one or more additional unique public keys of one or more additional authorized users that have granted access to the data content; and
  store the new or modified enveloped data key with the encrypted data content in the server to thereby enable access to the data content by the first user and the one or more additional authorized users using their respective user private keys.

In an embodiment, the server is further configured to: decrypt the encrypted data content using the decrypted data key; convert the decrypted data content into a different file format than its original file format; re-encrypt the converted data content using the decrypted data key or a new data key or keys; and store the re-encrypted converted data content with an associated new or modified enveloped data key or keys on the server to enable access to the data content by the first user and the one or more additional authorized users using their respective user private keys.

In an embodiment, before the server generates a new or modified enveloped data key, the server is further configured to: re-encrypt the converted data content using a new data key or data keys, and wherein the server is configured to generate the new or modified enveloped data key or keys comprising asymmetrically encrypted versions of the new data key or keys with the first user's public key, the server public key, and the unique public keys of one or more additional authorized users that have granted access to the data content; and store the re-encrypted converted data content with its associated new or modified enveloped data key or keys on the server to enable access to the data content by the first user and the one or more additional authorized users using their respective user private keys.

In an embodiment, the server is configured to convert the decrypted data content into a different file format than its original file format by generating more than one new converted files of a different format that collectively representing the original data content, and the server being further configured to: re-encrypt each of the new converted files with its own respective unique data key; generate new enveloped data keys for each of the respective encrypted new converted files using the first user's public key, the server public key, and the public keys of the one or more additional authorized users that have been granted access to the data content; and store the re-encrypted new converted data files with their respective associated new enveloped data keys on the server to enable access to the data content by the first user and the one or more additional authorized users using their respective user private keys.

In an embodiment, the decrypted data content is a multi-page document file, and the server is configured to convert the multi-page document file into a plurality of single-page document files of a different format.

In an embodiment, the server is configured to convert the decrypted data content into a browser-viewable file format that allows for direct browser display on an electronic user device.

In an embodiment, the server is configured to convert the decrypted data content into an image or text file format.

In an embodiment, the server comprises: a main server platform that is in accessible data communication with the one or more electronic user devices over the data network; and one or more security private platforms that have a private data communication link to the main server platform, and wherein the one or more security private platforms that are configured to retrieve the encrypted data from the main server perform, decrypt the encrypted data content, convert the encrypted data content into a different file format, re-encrypt the converted data content, and then transmit or transfer the re-encrypted converted data content with its associated new or modified enveloped data key or keys back to the main server platform for storage.

In an embodiment, the server comprises: a main server platform that is in accessible data communication with the one or more electronic user devices over the data network; and one or more security private platforms that have a private data communication link to the main server platform, and wherein the one or more security private platforms are configured to retrieve the encrypted data from the main server platform and are configured to decrypt the enveloped data key, generate the new or modified enveloped data key, and then transmit or transfer the new or modified enveloped data key and encrypted data content back to the main server platform for storage.

In an embodiment, the one or more security private are configured with unilateral control the data communication with the main server platform in that the security private platforms are configured to initiate data communication with the main server platform by requesting data from and sending processed data back to the main server platform.

In an embodiment, the main server platform is configured to generate a service queue or queues comprising data identifying items of received encrypted data that require further processing, and wherein the one or more security private platforms are configured to monitor the one or more service queues and retrieve the identified items of encrypted data from the main server platform for processing based on the service queue or queues.

In an embodiment, the encrypted data content and associated enveloped data key or keys are stored on the main server platform.

In an embodiment, the encrypted data content comprises a data file or files comprising electronic media content for display or playback.

In an embodiment, the electronic media content comprises any one or more of the following: text, graphics, audio, and/or video.

In an embodiment, the encrypted data content comprises a digital comment or comments uploaded to the server by an authorized user relating to other encrypted data content the user is authorized to access.

In an embodiment, the digital comment is in the form of any of the following: text, audio, and/or video.

In a third aspect, the invention broadly consists in a method of accessing shared collaborative data by a registered user in an online collaboration system, the collaboration system comprising a server and one or more electronic user devices that are capable of data communication with the server over a data network, each registered user being allocated a unique asymmetric key pair comprising a user public key and a user private key for encryption and decryption, the method executed by a processor of the electronic user device comprising:

receiving from the server over the data network and storing in temporary memory on the user device the registered user's encrypted user private key, user public key, and a server public key;

decrypting the encrypted user private key using a password input by the registered user into the user device and storing the decrypted user private key in temporary memory;

requesting and receiving an item of encrypted data from the sever over the data network in response to user interaction with the user device, the registered user being authorised to access the item of encrypted data, the encrypted data comprising:

encrypted data content generated by symmetric encryption of the data content with a data key, and an associated enveloped data key comprising encrypted versions of the data key generated by asymmetric encryption of the data key with each of the user public keys of authorized registered users that have been granted access to the item of encrypted data content and a server public key respectively;

decrypting the enveloped data key with the decrypted user private key;

decrypting the encrypted data content with the decrypted data key; and presenting the decrypted data content to the registered user on the user device.

In an embodiment, the method is executing in a web browser of the user device.

In an embodiment, presenting the decrypted data content to the registered user on the user device comprises presenting the data content to the user directly in the web browser.

In an embodiment, the decrypted data content is in a browser-viewable file format that allows for direct browser display on the user device.

In an embodiment, the decrypted data content comprises a data file or files comprising electronic media content for display or playback.

In an embodiment, the electronic media content comprises any one or more of the following: text, graphics, audio, and/or video.

In an embodiment, the decrypted data content comprises a digital comment or comments uploaded to the server by an authorized user relating to other decrypted data content the user is authorized to access.

In an embodiment, the digital comment is in the form of any of the following: text, audio, and/or video.

In an embodiment, requesting and receiving multiple items of associated encrypted data content for decryption and concurrent presentation or display.

In an embodiment, the multiple items of associated encrypted data comprise an item of data content comprising electronic media content and one or more items of uploaded digital comments associated or linked to the electronic media content.

In a fourth aspect, the invention broadly consists in an electronic user device configured to provide access to shared collaborative data by a registered user in an online collaboration system, the collaboration system comprising a server and one or more electronic user devices that are capable of data communication with the server over a data network, each registered user being allocated a unique asymmetric key pair comprising a user public key and a user private key for encryption and decryption, the electronic user device comprising one or more processors configured to:
  receive from the server over the data network and store in temporary memory on the user device the registered user's encrypted user private key, user public key, and a server public key;
  decrypt the encrypted user private key using a password input by the registered user into the user device and store the decrypted user private key in temporary memory;
  request and receive an item of encrypted data from the sever over the data network in response to user interaction with the user device, the registered user being authorised to access the item of encrypted data, the encrypted data comprising:
    encrypted data content generated by symmetric encryption of the data content with a data key, and
    an associated enveloped data key comprising encrypted versions of the data key generated by asymmetric encryption of the data key with each of the user public keys of authorized registered users that have been granted access to the item of encrypted data content and a server public key respectively;
  decrypt the enveloped data key with the decrypted user private key;
  decrypt the encrypted data content with the decrypted data key; and
  present the decrypted data content to the registered user on the user device.

In an embodiment, the one or more processors operate in response to an application executing in a web browser of the user device.

In an embodiment, the one or more processors are configured to present the decrypted data content to the registered user on the user device by presenting the data content to the user directly in the web browser.

In an embodiment, the decrypted data content is in a browser-viewable file format that allows for direct browser display on the user device.

In an embodiment, the decrypted data content comprises a data file or files comprising electronic media content for display or playback.

In an embodiment, the electronic media content comprises any one or more of the following: text, graphics, audio, and/or video.

In an embodiment, the decrypted data content comprises a digital comment or comments uploaded to the server by an authorized user relating to other decrypted data content the user is authorized to access.

In an embodiment, the digital comment is in the form of any of the following: text, audio, and/or video.

In an embodiment, the one or more processors are configure to request and receive multiple items of associated encrypted data content for decryption and concurrent presentation or display in response to user interaction with the user device.

In an embodiment, the multiple items of associated encrypted data comprise an item of data content comprising electronic media content and one or more items of uploaded digital comments associated or linked to the electronic media content.

In a fifth aspect, the invention broadly consists in a method of uploading data file for sharing by a registered user in an online collaboration system, the collaboration system comprising a server and one or more electronic user devices that are capable of data communication with the server over a data network, each registered user being allocated a unique asymmetric key pair comprising a user public key and a user private key for encryption and decryption, the method executed by a processor of the electronic user device comprising:
  receiving from the server over the data network and storing in temporary memory on the user device the registered user's encrypted user private key, user public key, and a server public key;
  decrypting the encrypted user private key using a password input by the registered user into the user device and store the decrypted user private key in temporary memory;
  retrieving a selected data file for uploading in response to user interaction with the user device;
  generating a random data key;
  symmetrically encrypting the selected data file with the generated data key;
  generating an enveloped data key comprising asymmetrically encrypted versions of the data key generated using the user public key and server public key from memory respectively; and
  transmitting the encrypted data file and enveloped data key to the server for storage over the data network.

In an embodiment, the method further comprising, in response to user interaction, transmitting data to the server indicative of other selected registered users that are authorised to access the uploaded data file so that the server can modify the enveloped data key to also include versions of the data key that are asymmetrically encrypted with the user public keys of the other selected authorised registered users to thereby enable future access to the data file by such authorised users.

In a sixth aspect, the invention broadly consists in an electronic user device configured to enable uploading data file for sharing by a registered user in an online collaboration system, the collaboration system comprising a server and one or more electronic user devices that are capable of data communication with the server over a data network, each registered user being allocated a unique asymmetric key pair comprising a user public key and a user private key for encryption and decryption, the electronic user device comprising one or more processors configured to:

receive from the server over the data network and storing in temporary memory on the user device the registered user's encrypted user private key, user public key, and a server public key;

decrypt the encrypted user private key using a password input by the registered user into the user device and store the decrypted user private key in temporary memory;

retrieve a selected data file for uploading in response to user interaction with the user device;

generate a random data key;

symmetrically encrypt the selected data file with the generated data key;

generate an enveloped data key comprising asymmetrically encrypted versions of the data key generated using the user public key and server public key from memory respectively; and transmit the encrypted data file and enveloped data key over the data network to the server for processing and storage.

In an embodiment, the one or more processors are further configured to, in response to user interaction, transmit data to the server indicative of other selected registered users that are authorised to access the uploaded data file so that the server can modify the enveloped data key to also include versions of the data key that are asymmetrically encrypted with the user public keys of the other selected authorised registered users to thereby enable future access to the data file by such authorised users.

In another aspect, the invention broadly consists in a method of processing a data key, said data key being an encryption key used to encrypt data content, said data key itself being encrypted by at least a user public key and a server public key, the method comprising the steps of:

decrypting the encrypted data key using a server private key, obtaining one or more user public keys, wherein each user public key is associated with an authorized user who is allowed access of the encrypted data content, and each user public key has a corresponding user private key, re-encrypting the data key with the one or more user public keys and the server public key so that the data key can be decrypted by the one or more user's private keys.

In one form, before re-encrypting the data key with one or more user public keys and the server public key, the method further comprises the steps of:

decrypting the encrypted data content using the decrypted data key, converting the data content into a format which can be directly displayed or viewed by a user in a web browser window, re-encrypting the data content using the data key.

In one form, encrypting the data key comprises digital enveloping the data key such that the encrypted data key can be decrypted by a single corresponding private key of each of the public keys used to encrypt the data key.

In one form at least the steps of decrypting the encrypted data key and re-encrypting the data key with one or more authorized user public keys and the server public key are carried out on a private machine of a server and/or in a private network of a server network.

Alternatively, all of the steps above are carried out on the private machine and/or in the private network.

The private network may be a virtual private network or a real private network which is used to connect machines and networks privately rather than being exposed to the general internet.

In one configuration, the method further comprises: creating a service queue, wherein the service queue comprises reference data indicative of the data key and/or the data content which needs processing by one or more of the steps above.

In one form, the method further comprises:
obtaining or retrieving reference data from the service queue,
retrieving associated data content from server storage based on the reference data.

In one configuration, the data content is in the form of a document file, and/or a comment made by one or more users.

In one form the document file comprises at least a main body which carries text content such as exam papers, medical history, song lyrics, literature works, legal documents such as contracts and so on. Alternatively or in addition, the document file may also comprise content such as artwork, multimedia files such as movies and music, and so on.

In one form, converting the data content into a format allowing direct browser display comprises converting a multi-page document into multiple single-page documents. Alternatively or in addition, converting the data content into a format allowing direct browser display comprises converting a document file into a plurality of images and/or text files.

In one form, re-encrypting the data content using the data key comprises re-encrypting each of the single-page documents using a data key.

In one form, the method further comprises:
enabling a user to create data content on a user computer,
generating encryption and decryption keys associated with the user,
encrypting the data content created using the user encryption key, and
transmitting the encrypted data content from the user computer to the server storage via secure internet connection.

In one form, the encryption and decryption keys associated with each user comprises a user key pair including at least a user public key and a user private key, wherein the user private key is used to decrypt the data encrypted by the user public key.

In one form, the user key pair is created based on entropy collected from the user input. Each user key in the user key pair may comprise 128-bit, or 256-bit, or 1024-bit, or 2048-bit, or 4096-bit or 8192-bit of data.

In one form, each user has an associated user name and a password.

In one form, the user private key is encrypted using the plaintext version of the password and the plaintext password is double hashed.

In one form, the method comprises generating a user key passport wherein the user key passport comprises the username, the double-hashed password, the encrypted user private key, the user public key and the server public key.

In an embodiment, the user key passport is first generated when a user creates the user name and password and then sent to server for storage.

In an embodiment, the method further comprises adding a server public key to the user key passport, and delivering the updated user key passport to a user device for allowing the user to access encrypted data content using the updated user key passport.

In an embodiment, the user key pair is generated only once per user.

In one form, the keys associated with each user also comprises one or more data keys which are used to encrypt and decrypt data content created by the user or generated on a user device.

In one form, encrypting the data content comprises:
encrypting the data content using the data key, then
encrypting or enveloping the data key using the user's public key and the server public key.

In an embodiment, the data content is symmetrically encrypted by the data key.

In an embodiment, the data key is asymmetrically encrypted or digitally enveloped by the server public key or one or more user's public keys.

In one form, transferring or transmitting the encrypted data content from the user computer to the server comprises transferring or transmitting both the encrypted data content and the encrypted data key to the server.

In one form, the steps of enabling a user to create data content, encrypting the data content created and transferring the encrypted data content from the user computer to the server are carried out in a user application running on the user computer.

In an embodiment, the user application is embedded in a browser window and a user is arranged to access the user application by visiting a website, or a URL from within the browser window.

In an embodiment, the user application is embedded in the website as one or more JavaScript applications.

In one form, when a user visits the website, the JavaScript automatically runs within the browser window on a user device such as a user computer.

In one form, the website is hosted by the remote server.

In another aspect, the invention broadly consists in a server having stored thereon computer executable instructions that, when executed on a processing device or devices, cause the processing device to perform the method of the first aspect of the invention for managing encrypted data content in a collaborative environment.

The server may be any form of data server, computers, hosted services or cloud infrastructure.

In one form, the computer executable instructions are in the form of a server application.

In one form, the server application comprises:
a data processing module for receiving and processing encrypted data content received at the server, the data processing module generates a service queue for storing reference data indicative of encryption and decryption information of encrypted data content,
a server key module for processing encryption and decryption information of the server data content, and
a file converting module for converting the data content into a form which can be directly displayed in a web browser on a user device.

In one form, at least the server key module is a private machine and is configured to request data from the service queue and a server main platform, and push data back to server main platform after processing. The server main platform cannot initiate a data exchange with the private machine.

In an embodiment, the main server platform is in data communication with one or more remotely located user devices such as user computers.

In an embodiment, all the data communication between the user devices and the server platform are encrypted.

In one form, the main server platform comprises storage medium for storing user information, encrypted data content and server application related data.

In a another aspect, the invention broadly consists in a programmable user device such as a user computer having a processor or processors that are configured to execute computer-readable instructions to execute the method of the first aspect of the invention for managing encrypted data content in a collaborative environment.

In one form, the computer executable instructions are in the form of a user application.

In one form, the user application is provided as one or more JavaScript applications enabled to run in a website.

In one form, the user application comprises:
an editing module for enabling the user to create data content for example editing or commenting on a document file,
a user key module for generating encrypting and decrypting keys,
an encryption module for encrypting data content, and
a decryption module for decrypting the encrypted content retrieved from the server.

In a another aspect, the invention broadly consists in a method of sharing collaborative data in a cryptographic system, said system comprises one or more user devices configured to connect to a central server via internet, said method comprising:
receiving encrypted data content from a first user via a programmable user device operated by the user, wherein the data content is encrypted on the user device by a data encryption key, and the data encryption key is encrypted by the first user's public key and a server public key,
storing the encrypted data content and the encrypted data encryption key on the server,
receiving an access request from a second user for access of the encrypted data content,
decrypting the data encryption key using a server private key, wherein the server private key and the server public key form an asymmetric key pair,
re-encrypting the data encryption key using the first and the second user's public keys and the server public key, and
storing the re-encrypted data encryption key on the server.

In one configuration, before re-encrypting the data encryption key, the method further comprises:
decrypting the encrypted data content using the data encryption key,
converting the decrypted data content into a file format which allows direct browser display, and
re-encrypting the data content using the data encryption key.

In one form, converting the decrypted data content into a file format which allows direct browser display also comprises converting a multi-page document file into a plurality of single-page document files.

In one form, the re-encrypting the data content using the data encryption key comprises individually encrypting each of the plurality of single-page files using a data encryption key, and then encrypting the data encryption key using authorized user's public keys and the server public key.

In one form, the file formats which allow direct browser display are image files and text files.

In one form, the decrypting and the re-encrypting of the data encryption key are performed in a private machine of the central server.

In one form, the decrypting and the re-encrypting of the data content and converting the data content into a format allowing direct browser display are also performed in a private machine of the central server.

In one configuration, the central server comprises a main platform which is in data communication with the one or more user computers, and the private machine is configured to initiate data exchange with the main platform by requesting data and sending processed data back to the main platform. The main platform is not able to initiate a data exchange with the private machine.

In one form, the encrypted data content and the encrypted data encryption key are stored on the main platform of the central server.

In a another aspect, the invention consists in a method of enabling user access of encrypted server data from a user computer, wherein the server data is encrypted by a data key, and the data key being encrypted by the authorized users' public keys and a server public key, said method comprising:
  establishing data communication between a user computer and a remote server,
  enabling user access of the encrypted data content and the encrypted data encryption key stored on the server by arranging the user computer to:
    decrypt the encrypted data encryption key using a user private key,
    decrypt the encrypted data content using the decrypted data encryption key, and
    display the revealed data content to a user on a user computer display.

In one form, the user private key is encrypted using the plaintext version of a password and the plaintext password is double hashed.

In one form, enabling user access of the encrypted data content and the encrypted data encryption key comprises retrieving the data content and the encryption key from the server, and only allowing the data content and the encryption key to reside in volatile memory on the user computer.

In one form, the method comprises generating an asymmetric key pair for each authorized user on a user computer, wherein each key pair comprises a user public key for encrypting data and a user private key for decrypting data encrypted by the user public key of the key pair.

In an embodiment, the server data is encrypted on the user computer and transferred to the server storage medium via the internet.

In one form, the server data may be subjected to a key managing process so that all the authorized users can access the encrypted server data on their associated user computers.

In an embodiment, the key managing process is performed in a private machine or in a private network of the server and comprises:
  decrypting the encrypted data key using a server private key,
  retrieving public keys of the authorized users,
  re-encrypting the data key using the authorized users' public keys and the server public key, and
  sending the re-encrypted data key back to server storage.

In an embodiment, the server data may also be subjected to a file converting process so that the data can be displayed in a web browser on a user computer.

In an embodiment, the file converting process is performed before the data key is re-encrypted.

In one form, the file converting process comprises:
  decrypting the encrypted data content using decrypted data key,
  converting the data into a browser friendly format,
  and optionally converting a multi-page document into a plurality of single page documents, and
  re-encrypting the data or the documents using a data key.

In one form, the data or the documents is/are symmetrically encrypted by the data key, and the data key is digitally enveloped by the user public keys and the server public key.

In another aspect, the invention broadly consists in a computer-readable medium having stored thereon computer executable instructions that, when executed on a processing device or devices, cause the processing device or devices to perform a method of any one of the previous aspects of the invention.

Each aspect of the invention above may have any one or more of the features mentioned in respect of any one of the other aspects of the invention.

Definitions and Phrases

The term 'encryption' as used in this specification and claims is intended to mean, unless the context suggests otherwise, the process of encoding data, messages or information in such a way that only authorized parties can access or read it.

The phrases 'symmetric encryption' or 'symmetrically encrypted' as used in this specification and claims is intended to mean, unless the context suggests otherwise, any encryption method, algorithm or process in which the encryption and the decryption keys are the same, i.e. only one key is involved in the encryption and the decryption.

The phrases 'public encryption' or 'asymmetric encryption' or 'asymmetrically encrypted' as used in this specification and claims are intended to mean, unless the context suggests otherwise, any encryption method, algorithm or process in which the encryption key and the decryption key are different such as, but not limited to, processes that use a public and private key pair in which the public key is used to encrypt data and the private key is used to decrypt data.

The phrase 'web browser' or term 'browser' as used in this specification and claims are intended to include, unless the context suggests otherwise, any software application on an electronic user device that enables the user to access, view, traverse and/or interact with data content from remote servers over a data network or connection such as, but not limited to, applications that enable a user to access, view or interact with web content such as web pages or websites or other data content hosted by web servers or other data servers over the internet, at least one such browser application program typically being a default or stock application program provided on most electronic user devices and including, by way of example only, Microsoft Internet Explorer browser, Google Chrome browser, Mozilla Firefox browser, mobile browsers on smart phones, and the like.

The phrase 'digital enveloping' or term 'enveloping' as used in this specification and claims are intended to mean, unless the context suggests otherwise, an encryption method, algorithm or process in which a single data key, which is used to symmetrically encrypt a data file or data content, is itself asymmetrically encrypted using one or more public keys to generate an envelope comprising a number of encrypted versions of the data key. Any one of the private keys associated with the public key(s) in the encryption envelope can decrypt and reveal the single data key, which in turn can be used to decrypt the data file or data content.

The phrase 'browser-viewable format' as used in this specification and claims, unless the context suggests otherwise, is intended to mean a file format that can be directly presented, e.g. for display and/or playback, in a convention web browser without requiring additional proprietary software or plug-ins to be installed on the electronic device to enable viewing or playback of the file format in the browser.

The phrase 'electronic media content' as used in this specification and claims, unless the context suggests otherwise, is intended to mean any digital or electronic content that can be displayed, played-back, or otherwise presented on the display and/or audio output of an electronic user device, including files or file formats comprising text, graphics, audio, video, either alone or in any combination such as multimedia content.

The phrase 'computer-readable medium' should be taken to include a single medium or multiple media. Examples of multiple media include a centralised or distributed database and/or associated caches. These multiple media store the one or more sets of computer executable instructions. The phrase 'computer readable medium' should also be taken to include any medium that is capable of storing, encoding or carrying a set of instructions for execution by a processor of a computing device and that cause the processor to perform any one or more of the methods described herein. The computer-readable medium is also capable of storing, encoding or carrying data structures used by or associated with these sets of instructions. The phrase 'computer-readable medium' includes solid-state memories, optical media and magnetic media.

The term 'comprising' as used in this specification and claims means 'consisting at least in part of'. When interpreting each statement in this specification and claims that includes the term 'comprising', features other than that or those prefaced by the term may also be present. Related terms such as 'comprise' and 'comprises' are to be interpreted in the same manner.

As used herein the term 'and/or' means 'and' or 'or', or both.

As used herein '(s)' following a noun means the plural and/or singular forms of the noun.

The invention consists in the foregoing and also envisages constructions of which the following gives examples only.

BRIEF DESCRIPTION OF THE DRAWINGS

Preferred embodiments of the invention will be described by way of example only and with reference to the drawings, in which.

DETAILED DESCRIPTION OF PREFERRED EMBODIMENTS

In the following description, specific details are given to provide a thorough understanding of the embodiments. However, it will be understood by one of ordinary skill in the art that the embodiments may be practiced without these specific details. For example, software modules, functions, circuits, etc., may be shown in block diagrams in order not to obscure the embodiments in unnecessary detail. In other instances, well-known modules, structures and techniques may not be shown in detail in order not to obscure the embodiments.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc., in a computer program. When a process corresponds to a function, its termination corresponds to a return of the function to the calling function or a main function.

Aspects of the systems and methods described below may be operable on any type of general purpose computer system or computing device, including, but not limited to, a desktop, laptop, notebook, tablet, smart television, or mobile device. The term 'mobile device' includes, but is not limited to, a wireless device, a mobile phone, a smart phone, a mobile communication device, a user communication device, personal digital assistant, mobile hand-held computer, a laptop computer, wearable electronic devices such as smart watches or head-mounted devices or displays, an electronic book reader and reading devices and/or other types of mobile devices typically carried by individuals and/or having some form of communication capabilities (e.g., wireless, infrared, short-range radio, cellular etc.) or other portable electronic devices capable of displaying electronic media content received or retrieved over a data network such as the internet, such as in a web browser application or similar.

1. Overview

Figure 1:
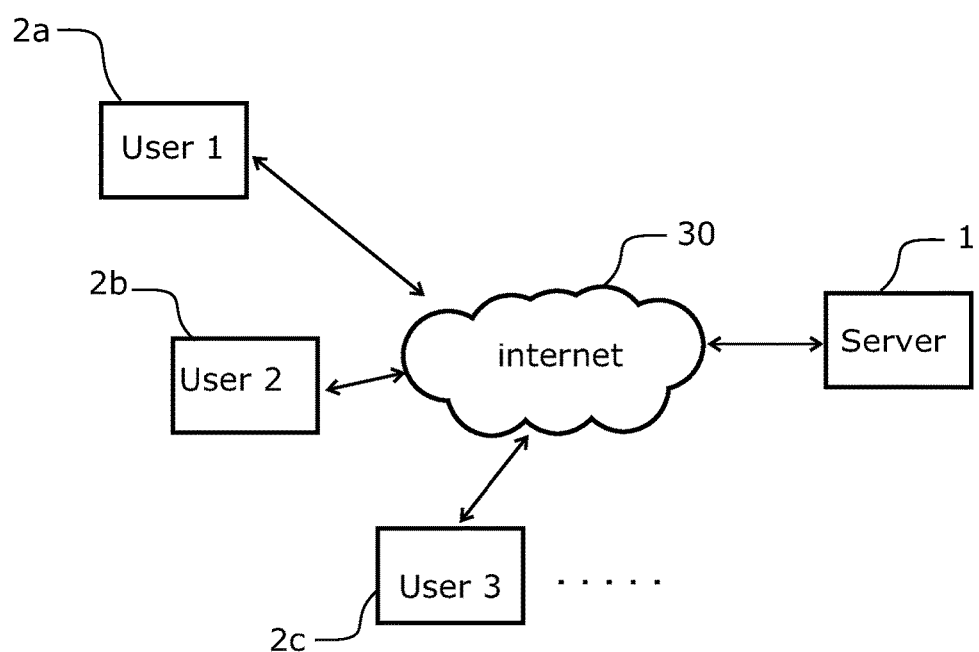
FIG. 1 shows an overview of the encrypted online collaboration system architecture comprising a server and one or more electronic user devices in accordance with an embodiment.

FIG. 1 shows an overview of an embodiment of the system architecture which enables encrypted data communication over a data connection or data network 30, such as the internet, between a plurality of users 2a-2c operating respective electronic user devices and a server 1. The system may be configured for or implemented in various collaborative applications which require secure, encrypted data communication between multiple parties. Examples of such collaborative applications may include, but are not limited to, encrypted online document proofing and approval systems, encrypted file delivery and storage systems, or other applications that require the sharing of sensitive data or electronic media content such as examination papers, medical history of patients, song lyrics, literature works, artwork, multimedia files such as movies and music, legal documents such as contracts and so on.

By way of example only, an embodiment of the encrypted collaboration system and method will be described with reference to FIGS. 1-15 in the context of its implementation or configuration as an encrypted online collaboration electronic media content proofing and approval system ('collaboration system'), but it will be appreciated that the system and method may be adapted for any other suitable applications as previously mentioned.

In this embodiment, the collaborative system allows a plurality of registered users 2 or reviewers to each review a common data file comprising electronic media content and provide their comments for proofing and approval purposes via their own respective electronic user device. The collaboration system is configured to handle a range of data file formats comprising a range of different types of electronic media content including, but not limited to, text documents, graphics or picture files, video files, audio files, and/or multimedia electronic content comprising a combination of one or more different types of content.

In typical operation, a first user 2a prepares and uploads a data file, via their electronic user device, to be reviewed by other users 2b-2c to a central server 1 over a data network 30, such as the internet. In this embodiment, the first user 2a can be considered as the author of the data file. The author can designate one or more other registered users 2b-2c of the system or invite new users to be authorized as 'reviewers' to access the data file for review by electronically-sharing the uploaded data file with them via the system, or alternatively the access or authorization of registered users to data files may be determined by predetermined rules or system settings. For example, workgroups of multiple registered users may be created for enabling one or more data files to be uploaded by a user and shared with the workgroup to enable review and approval of the document. It will be appreciated the number of registered users in the system may be effectively limitless, depending on the capacity and resources of the system Each authorized reviewer of a data file may view and/or playback the content of the data file via an application program on their electronic user device, whether the content comprises a displayed document, video and/or or audio. Any reviewer comments by the already posted by authorized reviewers against the data file will also be displayed to the reviewer. Each reviewer, including the original uploading author, is able to post or upload notes or comments about the content and can indicate when their review is complete via a graphical user interface. After reviewing or in real-time, each reviewer's comments are uploaded to the server for storage and associated with the data file reviewed such that all comments are viewable by all authorized reviewers of the data file. In one configuration, the collaboration system may be configured to electronically relay or notify 'offline' reviewers of new comments or posts on a data file. In one configuration, any new comments posted may be refreshed to 'online' reviewers in real-time or alternatively the comments may be refreshed periodically at a configurable frequency. In one configuration, only the author of a data file may be provided with edit rights enabling them to edit the data file or upload a new edited version of the data file being reviewed in response to the comments. In other configurations, one or more selected or alternatively all authorized reviewers may be granted edit rights.

In this embodiment, the collaboration system allows a plurality of registered users to communicate, and in particular, proof and approve data files via the internet, while being fully encrypted from end to end. In other words, all data communication and data content, for example data files uploaded and/or comments made by reviewers, between the electronic user devices and the server 1 is encrypted. In this embodiment, the collaboration system is configured to employ both symmetric and asymmetric encryption on the user and server sides to provide security. Only the authorized reviewers of a data file are able to successfully decrypt and access for viewing and/or playback the encrypted data content, which typically comprises the data file and any associated comments.

In this embodiment, the collaboration system comprises a user application configured and adapted to operate or run on each electronic user device associated with registered users and a server application configured to operate on a server or servers. For clarity of explanation, the functions of the user application and server applications for running the system have been separated into modules that will each be explained in further detail as to their function and operation within the system. However, it will be appreciated that the modules and/or their functions may be integrated or further separated into additional modules, and at least some of these modules share information and data with each other to carry out their particular function or function(s) within the system. The server modules may be performed on a single server machine or distributed across a plurality of server machines, and the modules may be integrated with each other or further separated into additional modules depending on requirements.

In this embodiment, the user application is configured to run or execute in or via a web browser on an electronic user device, and this allows any user to access and utilize the system via a browser window on a stock or default web browser. In this embodiment, the user application is provided in the form of a website-embedded application program, such as JavaScript, that is configured to run or execute in the background of a conventional web browser such as, but not limited to, Microsoft Internet Explorer browser, Mozilla Firefox browser, Google Chrome browser or similar for example. It will be appreciated that the user application may also be provided in any other form of website or webpage interface. In this embodiment, the user application performs at least the following tasks or functions: provides a graphical user interface for interacting with the system, encrypting data content (e.g. data files and/or comments) originating from the electronic user device using one or more encryption keys, sending or transmitting the encrypted data content and the encryption keys to the server for storage, receiving encrypted data content from the server and decrypting the data content, displaying and/or enabling playback of the decrypted data content to the user on their electronic user device, e.g. via a display and/or audio output components of or associated with the device. In this embodiment, the collaboration system is configured such that only authorized users associated with particular data content will have the correct decryption keys for decrypting and viewing that particular encrypted data content from the server. The user application and electronic user device is described in further detail in section 2.

In this embodiment, the server application is configured to manage the overall system operation including, but not limited to, managing user information, managing encryption and decryption keys, receiving incoming encrypted data content from users, handling user requests, processing the encrypted data content received, and storing the processed encrypted data content in server storage. In this embodiment, the server application comprises a server key module which manages encrypting and/or decrypting information of the encrypted data content stored on the server. The server application also comprises a file converting module that is operable to process and covert uploaded encrypted data files into a file format (browser-viewable file format) which can be directly displayed in a conventional web browser without requiring any proprietary software, such as for example Microsoft Word in the context of electronic documents, to be installed on the electronic user device. In this embodiment, at least some modules of the server application execute or operate on a main server platform and some modules execute or operate on one or more security private platforms in a private network or on a private machine which has no incoming internet access. Likewise, some of the server data may be stored on the main server platform, and some of the server data may be stored on the secure private platform(s). The server application and server configuration is described in further detail in section 3.

In this embodiment of the collaboration system, the data communication between the server application and the user application is encrypted in both directions. The data content originating from the electronic user device is encrypted by the user application before it leaves the user device and is transmitted to the server via a data network such as the internet. The data communication originating from the server is also encrypted before it leaves server for transmission to a user device. In this embodiment, the system is configured as a collaborative end-to-end cryptographic system that prevents particular data content, such as data files and comments, from being traced or viewed by users that are not authorised to do so.

2. User Application and Electronic User Device

Figure 2:
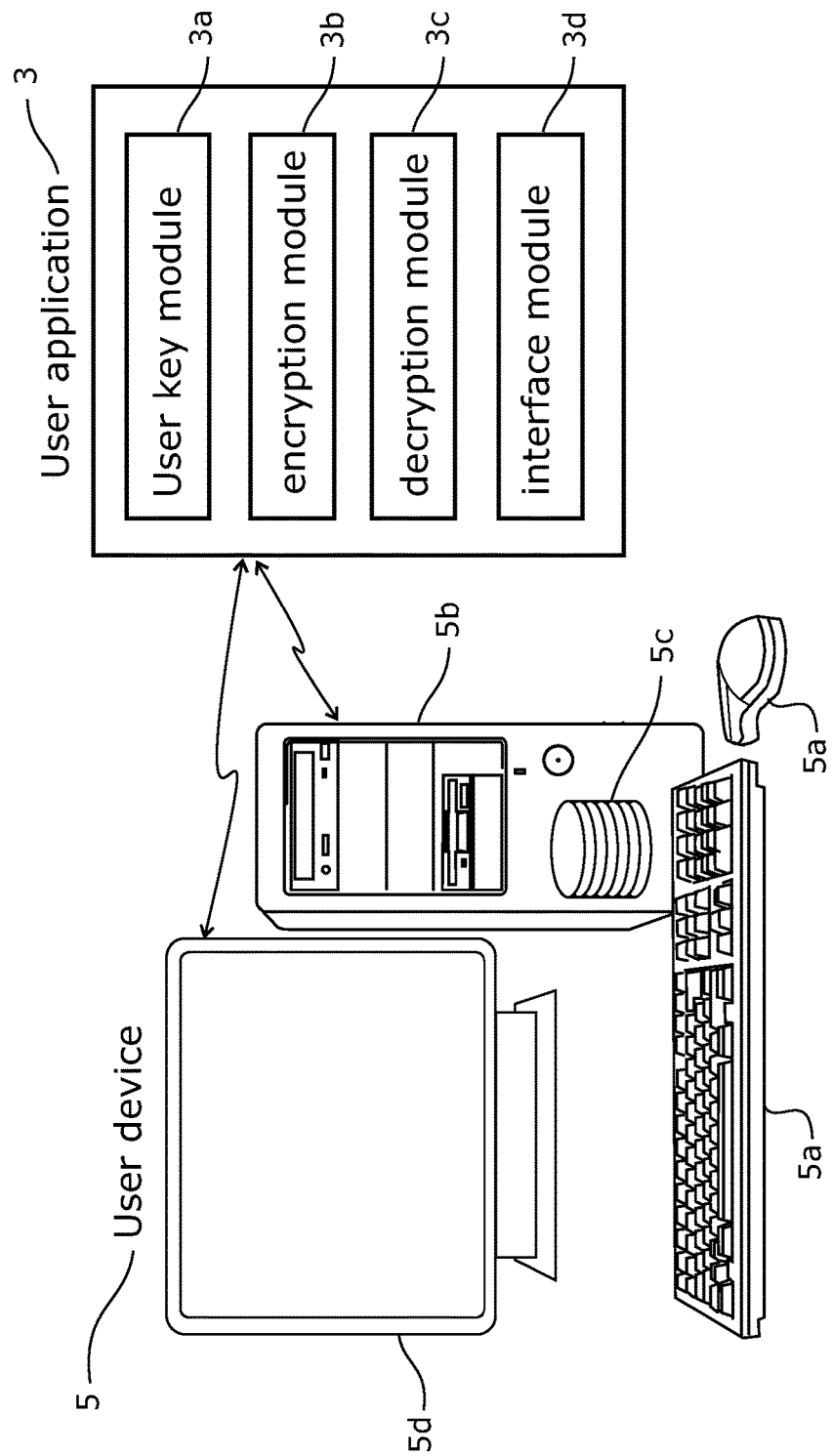
FIG. 2 shows a schematic diagram of main modules or components of a user application of the system executing on an electronic user device in accordance with an embodiment.

An exemplary schematic configuration of the main modules of the user application and an electronic user device are shown in FIG. 2. In this embodiment, the user application 3 comprises at least the following modules or engines:
 a user key module or engine 3a for generating encryption and decryption keys,
 an encryption module or engine 3b for encrypting data content,
 a decryption module or engine 3c for decrypting data content retrieved or received from the server, and
 an interface module or engine 3d, such as a graphical user interface, for enabling a user to interact with the system, including, but not limited to, registering as a new user and creating a new user login, logging into and out of the system, selecting and viewing desired data files for proofing or review, uploading data files for proofing, configuring review permissions associated with uploaded data files (i.e. configuring or selecting which registered users or groups of users may have access to a data file for review), uploading or posting comments on data files, editing data files directly in view of comments.

In this embodiment, the encryption and decryption modules 3b, 3c are configured for executing both symmetric and asymmetric encryption and decryption algorithms.

In this embodiment, the user application 3 is configured to be accessible or operate within a conventional web browser such as Firefox, Internet Explorer, Google Chrome, Opera, Safari and the like. By way of example only, the user application 3 is coded as one or more JavaScript applications which can run or executed directly within a web browser. This configuration enables user interaction with the server and other registered users to take place within a web browser environment. In the exemplary embodiment, as discussed further later, a user is able to visit a website which hosts the JavaScript user application. Each registered user is able to interact with other registered users of the system or reviewers and the server by visiting the website on the web browser of their electronic user device and interact with the functions of the system via the graphical user interface of the application program displayed within the web browser. While a website interface will typically be more widely accessible and more convenient to most users, it will be appreciated that alternative forms of application programs may also be used to access the system, including stand-alone or dedicated application programs that may be installed on an electronic user device specifically for the purpose of interacting with the collaboration system such as application programs that can be downloaded for executing on smart devices, for example iPhone or Android applications for iPhone and Android smart phones, or desktop software applications for running on a general purpose desktop or laptop computer for example.

In this embodiment, new or registered users may access the user application of the collaboration system via any suitable portable or non-portable electronic user device such as, but not limited to, a computer, including a general purpose computer such as a laptop or a desktop, or any other portable electronic device having data communication access and display capability including, but not limited to, Portable Digital Assistants (PDAs), mobile phones, smart phones, wearable user electronic devices for example Google Glass or smart watches, or any other device that is capable of assessing the internet via a web browser and displaying digital content on a display such as a smart television. Such electronic user devices typically at least comprise a processor, memory, data storage, user interface, display, and data communication.

By way of example only, FIG. 2 shows one form of electronic user device 5 in the form of a general purpose computer that may be used by a user to access the collaboration system. In this example, the computer 5 typically comprises one or more user interface components 5a such as a keyboard/keypad and mouse, display 5d for displaying the graphical user interface of the user application, a processor such as a Central Processing Unit or CPU for executing the user application, memory for user application data, data and/or network communication capability, data storage 5c such as a hard-disk drive or similar, and audio output such as speakers or similar. For the general purpose computer the display 5d is any conventional computer display screen. For other user electronic devices it will be appreciated that the display may be any form of display for presenting electronic data including, but not limited to, an LED display equipped on most smart phones and tablet devices, smart television display, a wearable display such as a head-mounted display, or it may be a virtual display and the information is simply projected onto the virtual display.

In one configuration of the collaboration system, the user application 3 does not permanently store any encrypted data content, for example a data file retrieved from the server 4, on the user device 3. The encrypted data is decrypted and displayed to a user on the display 5d, without requiring downloading of the actual encrypted data content from the server into data storage on the device. For example, the data file retrieved from the server 4 may only reside in temporary memory, such as browser memory (volatile). In this configuration, even if the user device 5 is obtained by an unauthorized party, the encrypted data content cannot be accessed as it is not locally stored on the user device in data storage.

In another configuration, some of the user application data may be stored permanently in data storage 5c and updated regularly, while other more sensitive user application data may only reside temporarily in volatile memory when the user application is running and deleted from such temporary memory (e.g. cached or volatile memory) when the user exits the user application, for example when the user logs out of the website user application or otherwise ends a session.

3. Server Application and Server

Figure 3:
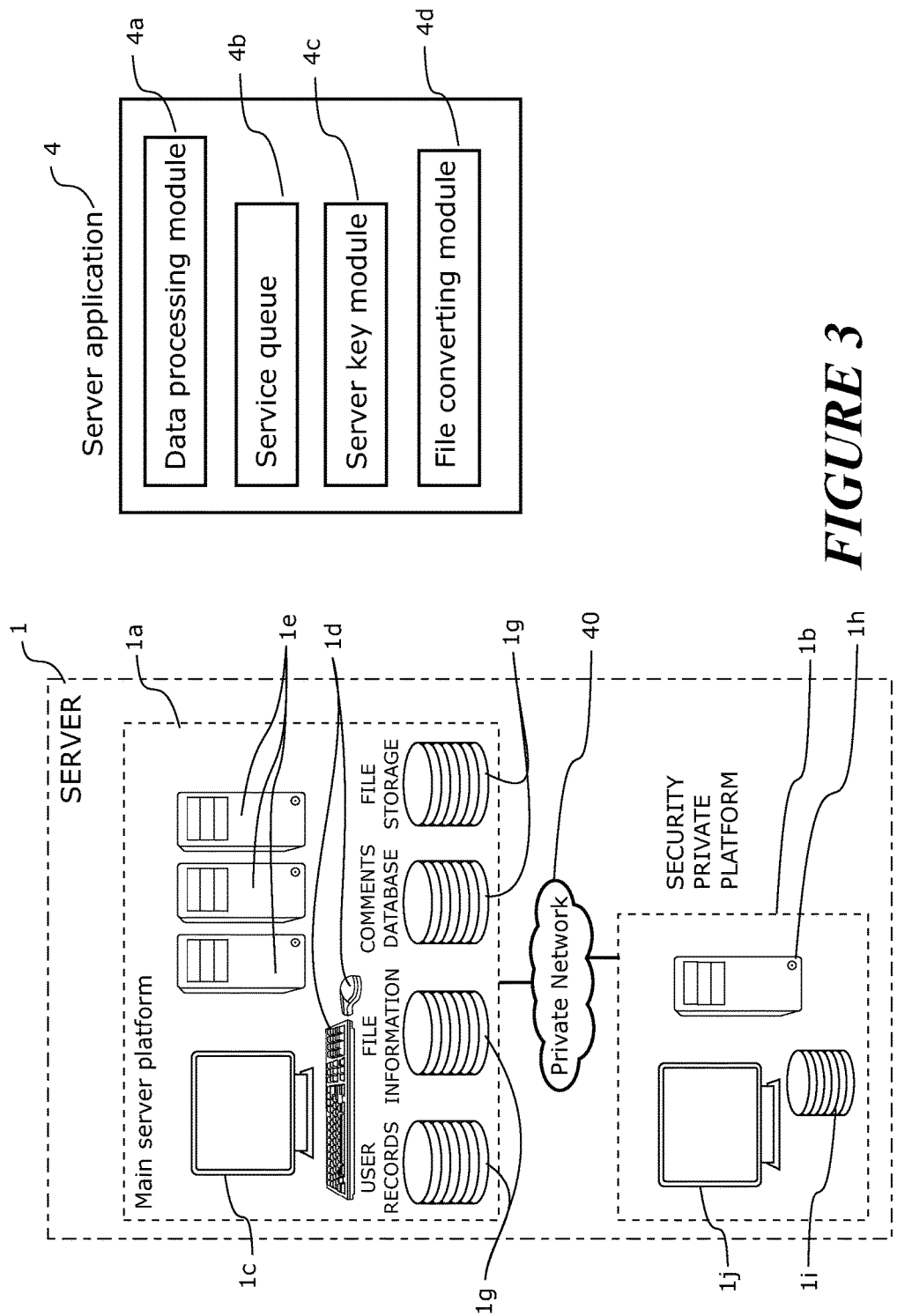
FIG. 3 shows a schematic diagram of main modules of a server application of the system executing on a server in accordance with an embodiment.

An exemplary configuration of the main modules of the server application 4 and server 1 are shown in FIG. 3. It will be appreciated that the server 1 may be provided in various configurations and may comprise or be in the form of a data server, web server, computers, hosted services or cloud infrastructure.

In this embodiment, the server 1 comprises a main server platform or machine 1a and one or more security private platforms or machines 1b. In one configuration, the main server platform 1a comprises one or more data processors 1e, such as servers or computers or similar each comprising a processor and memory, for analysing and processing server data. The main server platform further comprises a display 1c, data communication or network modules for transmitting and receiving data over a data network such as the internet, and one or more user interface components 1d such as a keyboard and a mouse to enable a system administrator to interface with the server, although a user interface is not necessarily essential as a system administrator may remotely control or interface with the server in some configurations. In this embodiment, the main server platform also comprises one or more databases 1g, such as storage devices or hard disk drives, for storing different types of server data. In one configuration, the main server platform comprises one or more databases for storing user records on registered users (such as user details, usernames, passwords, encryption keys and the like), one or more databases for storing data file information (such as information on the author of the data file and which registered users have permission to review the data file), one or more databases for storing comments posted or uploaded against data files, one or more databases for file storage (such as for storing the uploaded encrypted data files).

In one configuration, the or each security private platform 1b comprises one or more data processors 1h, such as servers or computers each comprising a processor and memory, for analysing and processing server data, data communication or network modules, one or more databases or file storage devices 1i, and a display 1j, although the display is not essential. In some embodiments, the security private platforms may be considered as being or comprising software security modules.

In this embodiment, the data processors 1e of the main server platform 1a are configured to execute or operate some of the server application modules, and the one or more security private platforms 1b are configured to execute or run other server application modules. In this embodiment, the main server platform 1a is operatively connected to the system data network 30, such as the internet, to enable users to access the system over the internet via their electronic user devices 5. In contrast, the the security private platforms 1b do not have incoming access from the internet but are configured for unilateral connection or unilateral interaction with the main server platform 1a over a private network 40 such as, but not limited to, a Virtual Private Network (VPN), a real Private Network (PN), or a network that uses private IP address space and which are not globally delegated, meaning that data packets addressed to private IP addresses cannot be transmitted through the public internet. By way of example, the unilateral configuration is such that the security private platform pulls data from or pushes data to the main server platform. In this embodiment, data cannot be pulled from the security private platforms 1b.

In this embodiment, the server application 4 comprises at least the following modules:
- a data processing module or engine 4a for receiving and processing server data (such as handling incoming and outgoing server data, generating and updating a processing or service queue, and generally controlling system operation), a service queue 4b generated by the data processing module 4a for storing information or reference data indicative of server data which needs further processing (for example the queue is populated with a list of reference or unique IDs associated with data content, such as data file or comments, that require further processing prior to storage on server, a server key module or engine 4c for managing encryption and decryption information associated with the server data content, and a file converting module or engine 4d for converting the data files into a browser-viewable format for direct display and/or playback in a web browser on an electronic user device 5.

An overview of the server application modules will be explained next, although more detail is provided in the example in section 4. The data processing module 4a of the server receives incoming user data such as, but not limited to, encrypted data content in the form of data files and comments, new user registration information, data file access or permission updates on which users are authorized to view data files, and data content requests from the users. The data processing module 4a processes and analyses the incoming data and responds accordingly. When receiving newly uploaded data files, updated permission information (i.e. the adding or removing of registered users to the list of authorized reviewers of a data file), or new comments, the reference or unique IDs associated with the effected data content, e.g. data files or comments, are added to the service queue 4b to indicate that data content requires further processing by the server key module 4c and possibly also the file converting module 4d. In this embodiment, the data processing module 4a and service queue reside and are operated on the main server platform 1a.

In this embodiment, the server key module 4c and file converting module 4d are configured to reside and execute or run on one or more security private platforms 1b, which are private machines or on a private network that has no incoming access from the internet. As mentioned above, the server key module 4c manages the encryption and decryption information of the encrypted data content stored on the server 1. It will be appreciated that there may be one or more server key modules 4c operating either on a single security private platform 1b or spread across multiple security private platforms 1b. In one configuration, the server key module 4c is configured to process both data files and comments. In another configure there may be a dedicated server key module 4b for processing data files, and another dedicated server key module 4c for processing comments.

In this embodiment, the server key module or modules 4c access the service queue 4b and obtain the reference IDs of encrypted data content that needs processing. The identified encrypted data content in the service queue 4b is then retrieved by the server key module 4c from one of the databases of the main server platform 1a, and the data content is processed. Depending on the nature of the processing required for each item of data content, the server key module may initiate the file converting module 4d to process the data content also. When the server key module 4c finishes processing of the encrypted data content, the processed data content is sent or transmitted back to the main server platform 1a for storage in the appropriate database where it can then be accessed by authorized users.

4. Example Collaboration System Operation

An example of the operation of the above embodiment of the collaboration system will be described in further detail with reference to FIGS. 4 to 15.

In this embodiment the user application 3 of the collaboration system is provided in the form of a JavaScript program that is accessed and executed via a web browser such as Windows Internet Explorer browser, Google Chrome browser, Mozilla Firefox browser or the like. A system user 2 is arranged to utilize functions of the application program and system from within the web browser directly, for example by interacting with a graphical user interface presented in the browser. Each user is able to encrypt and upload data content (e.g. data files and/or comments on data files), decrypt and view data content encrypted by other users, and optionally may edit data content in some configurations, all from within the browser.

To start using the user application 3, a user visits via their browser a host or server website that comprises the embedded JavaScript program. In this embodiment, the users are not required to download or install any additional user application software to access the system and therefore the system is generally accessible and convenient to use. It will be appreciated that in alternative embodiments, other forms or types of user application programs may be used to access the system, such as stand-alone or dedicated application programs that can be downloaded and installed on electronic user devices such as, but not limited to, computers, smart phones, tablet devices or the like.

4.1 New User Registration

Figure 4:
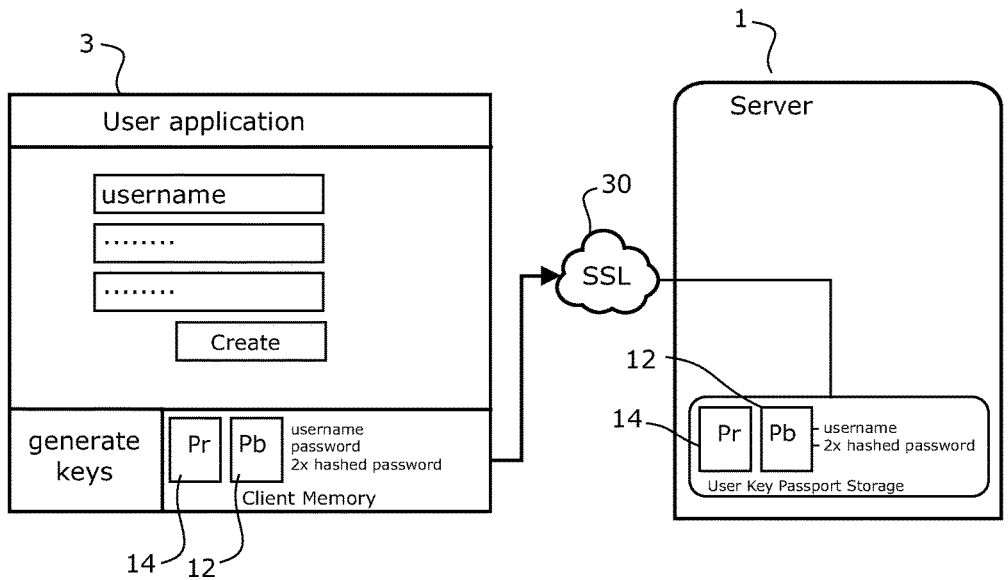
FIG. 4 shows a schematic diagram of the data flow and process for registering a new user in the system and creation of a user key passport in accordance with an embodiment.

As shown in FIG. 4, when a new user accesses the system for the first time via the user application, the system is configured to carry out a new user registration process which generally comprises the following steps:

obtaining from the user a username such as a pseudo name, an email address or similar, and a password, for user identification and log-on, generating one key pair unique to the user and which can be used to encrypt and decrypt data, and creating a user key passport and forwarding it to the server for storage.

In this embodiment, the user key module 3a of the user application is configured to generate the one key pair unique to the user during the new user registration process. As an example, the keys generated may include an asymmetric encryption key pair generated by the user key module 3a in the browser based on entropy and random sequences. The asymmetric key pair includes a user public key 12 and a user private key 14, where the user public key 12 is generally used for encrypting data and the user private key 14 is generally used for decrypting data that that is encrypted with the same user's public key 12. The user public key 12 and private key 14 may be 128 bit, or 256 bit, or 512 bit, or 1024 bit, or 2048 bit, or 4096 bit, or 8192 bit in length, depending on the system requirement and the level of encryption desired. The asymmetric key pair is generated by the Javascript user application within the browser and is held in the browser temporary memory until the new user registration process is completed.

In this embodiment, the generated user private key 14 of the pair is then encrypted using the plaintext version of the user password, and the plaintext password is then double hashed. This ensures the private key 14 can only be decrypted later by the person who knows the user password, and has typed it into the browser when logging in. The plaintext user password only sits in the browser memory (volatile), and is not transmitted to the server or otherwise stored on the user's electronic user device, e.g. on the hard drive disk or the like.

Next, the user application program is configured to generate a user key passport which comprises the username, the double-hashed password, encrypted user private key 14, user public key 12, and a server public key 13. The user key passport is sent to the server 1 by the user application program 3 to complete the new user registration process. The server application 4 on the server 1 receives the user key passport along with any other relevant information from the user and then creates a new user profile or a user ID for the new user, and stores this data in the user records database 1g on the main server platform 1a.

4.2 Regeneration of User Key Passport on Electronic User Device at Log-on

Figure 5:
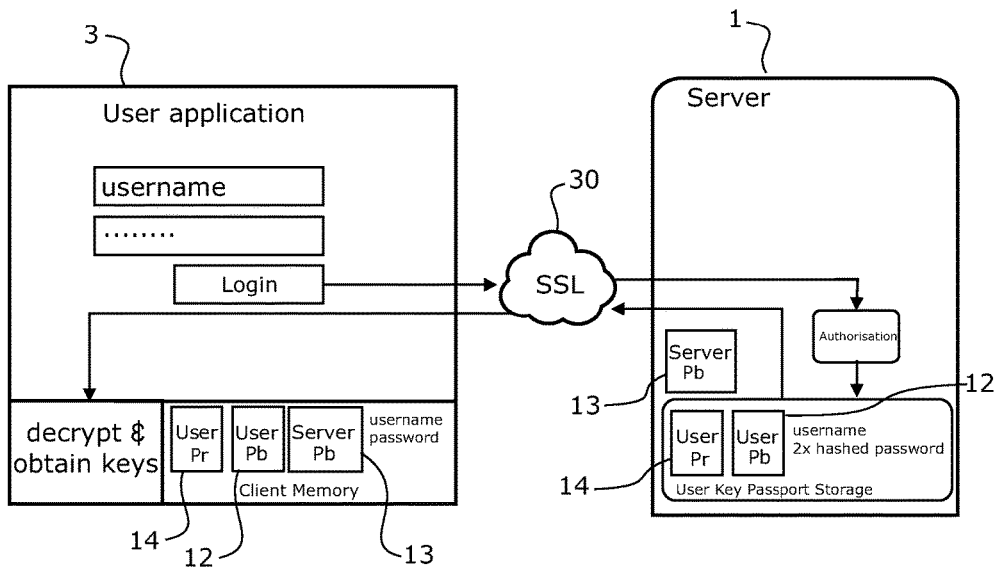
FIG. 5 shows the regeneration process of the user key passport on an electronic user device during login in accordance with an embodiment.

Referring to FIG. 5, when a user wishes to log-on to the system via a browser on any electronic user device, the system needs to transfer the user's user key passport from the server 1 to the Javascript user application 3 in the web browser executing on the electronic user device, and then decrypt the user key passport into browser or temporary memory for use during the session.

In this embodiment, the user logs onto the system by entering their username and password pair to identify the user as registered to use the system. The user application 3 double hashes the entered password and then sends the username with the double hashed password to the server 1 for verification and/or authorization. The username and plaintext password entered are held in the browser memory by the user application 3. If a correct username and password is entered, the server application 4 recognizes and identifies the user from the user records database 1g and responds to the log-in request by delivering the authorized user's user key passport to the user application 3 on the electronic user device 5.

In this embodiment, the user key passport delivered to the user application 3 after successful log-in comprises the keys required by the user application 3 to perform the encryption and decryption tasks. In one configuration, the keys in the user key passport comprise at least the encrypted user private key 14, the user public key 12, and the server public key 13.

Once the user application 3 receives the authorized user key passport from the server 1, the user application 3 decrypts user private key 14 using the plaintext password entered by the user (and which is stored in browser memory), and stores the decrypted user private key 14 in browser memory. The user public key 12 and the server public key 13 are also extracted from the authorized user key passport and stored in browser memory. The user application 3 is now capable of handling the encryption and decryption tasks required during use the system. In this embodiment, the system related data is saved or stored in volatile or temporary memory (e.g. client memory) on the user electronic device.

4.3 User Side Encryption of Data Content

Figure 6A:
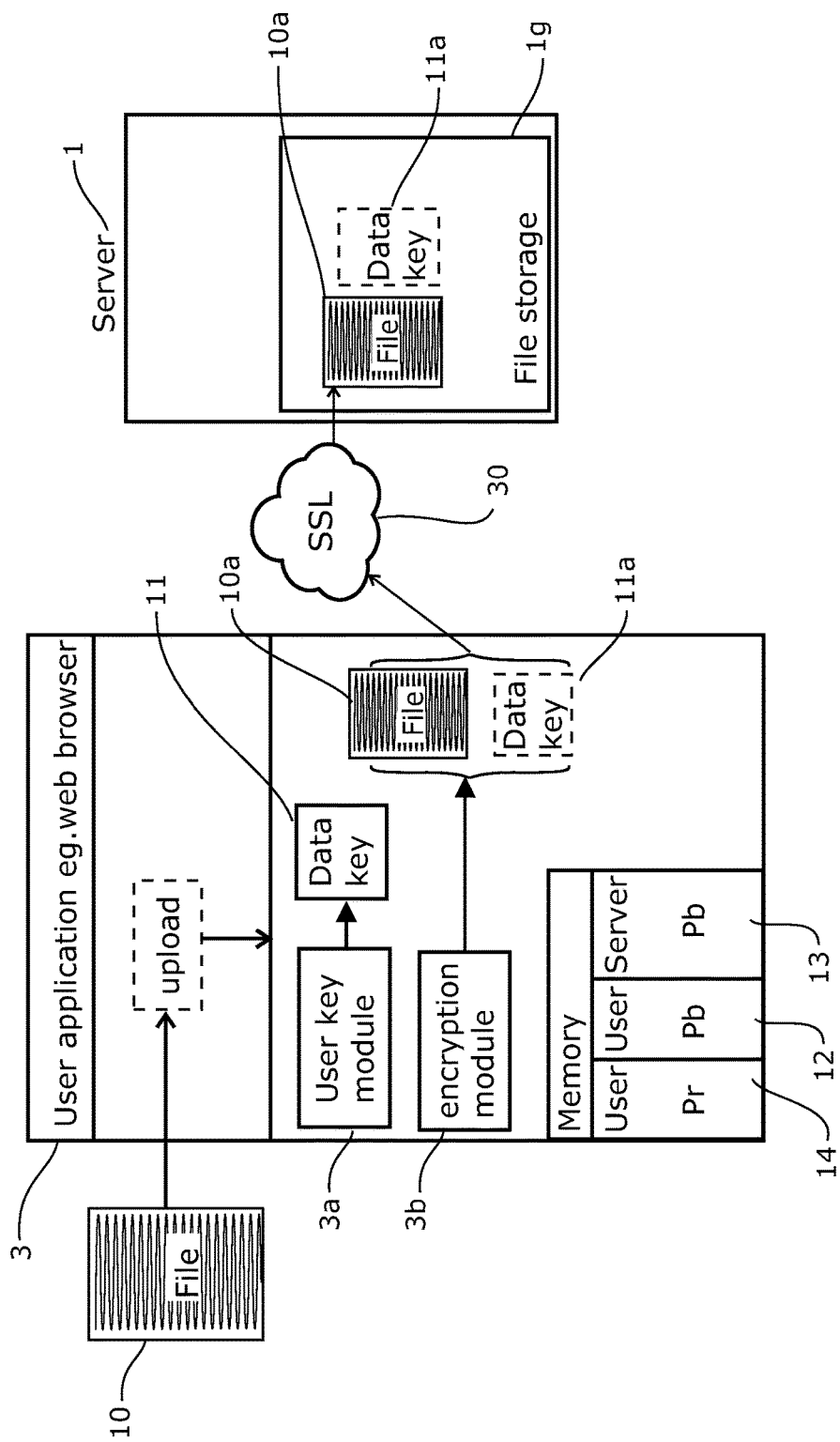
FIG. 6A shows a schematic diagram of the data flow and process of a user uploading a new data file, such as a document, into the system for storage, including the user side encryption process.
Figure 6B:
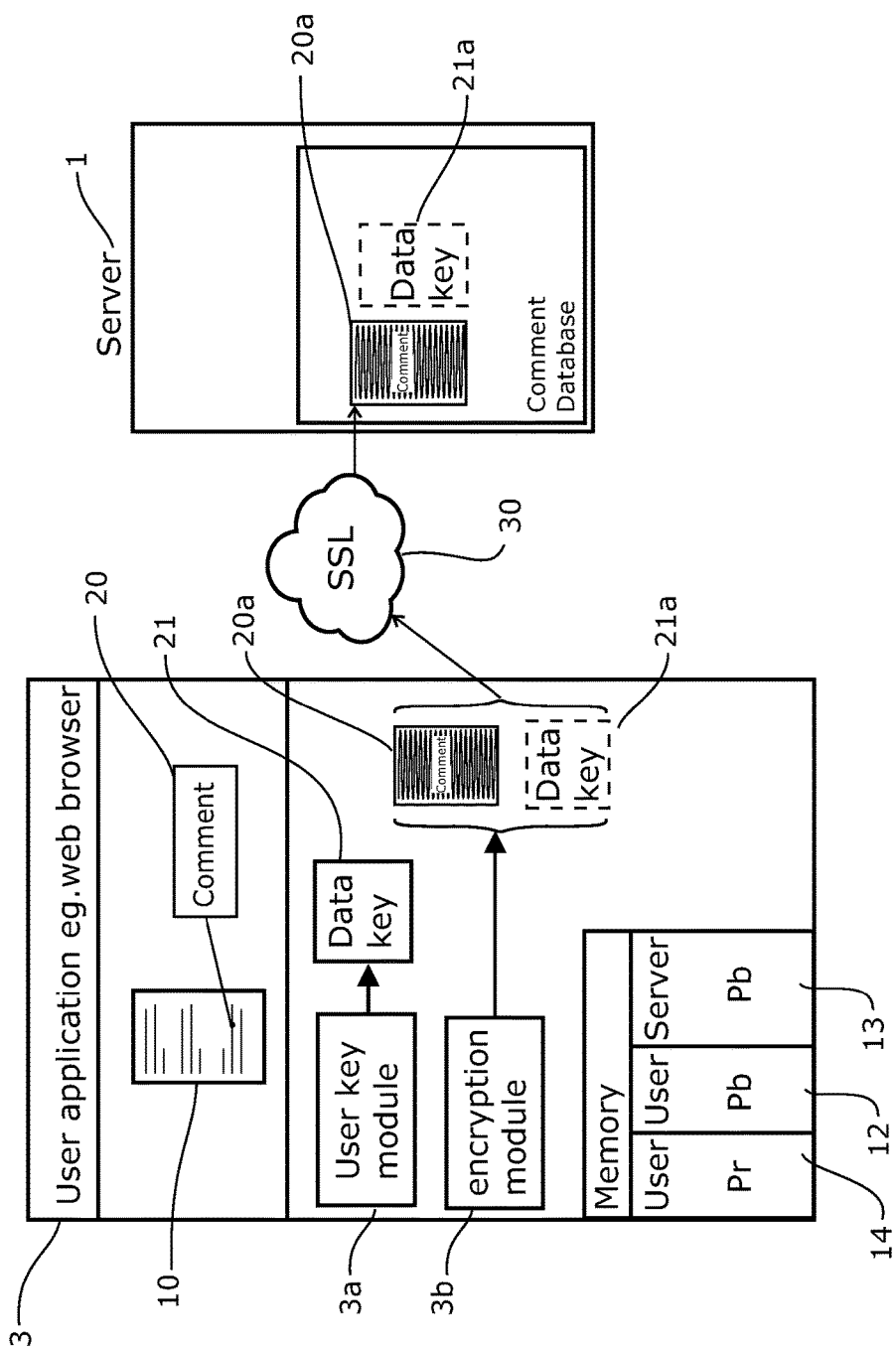
FIG. 6B shows a schematic diagram of the data flow and process of a user posting a comment into the system for storage when reviewing or proofing a data file, such as a document, including the user side encryption process.

As mentioned previously, the collaboration system is configured such that user generated data content (e.g. data files and comments) is encrypted by the encryption module 3b of the user application 3 before it is transmitted from the electronic user device 5 across the data network 30, e.g. internet, to the server 1. Referring to FIGS. 6A and 6B, the user side encryption of process for uploaded data content will be explained in more detail. In this collaboration system embodiment for electronic media content proofing and approval, the 'data content' may refer to both the data file (e.g. electronic document data file) being uploaded for review and the digitally posted reviewer comments such as suggested changes posted by various authorized reviewers. FIG. 6A relates to the user side encryption of uploaded data content in the form of data files, and FIG. 6B relates to the user side encryption of uploaded data content in the form of comments.

Data File Encryption

Referring to FIG. 6A, a user selects data content 10 for uploading into the system for proofing and approval. The data content may be any form of data file or file format comprising electronic media content for display or playback, including text, graphics, multimedia content, audio, video or the like. By way of example only, the user side encryption process will be described in the context of a user uploading a data file in the form of an electronic document comprising text and/or graphics (e.g. a Microsoft Word document) into the system for review by one or more other authorized registered users. The user selects the document data file 10 for uploading via the graphical user interface of the user application 3, e.g. using a conventional file explorer or other file selection process. The document data file 10 may reside in data storage on the electronic user device or may otherwise be accessible by the electronic user device, e.g. may be stored on a remote database or removable storage media for example. The encryption module 3b of the user application 3 is configured to encrypt the document data file 10 selected for upload, and then the encrypted document data file 10a is sent to server 1 via the data network 30 for processing and storage. The data transmission is typically over a data network 30 such as the internet typically using a Secure Sockets Layer (SSL) encrypted link or similar. In one example, all data communication between the electronic user device(s) and server is delivered via 2048 bit SSL.

In this embodiment, after the user selects the document data file 10 for uploading, the user key module 3a of the user application generates a random data key, in this example a 2048 or 4096 bit data key 11 although the length of bits may be varied depending on requirements of the system. The encryption module 3b of the user application 3 then uses the generated data key to symmetrically encrypt the document data file 10 to generate an encrypted document data file 10a. By symmetric encryption it is meant that the document data file 10 can be decrypted using the same data key 11, i.e. the data key that was used for the encryption. By way of example only, the symmetric encryption may be AES based encryption such as AES-256, or any other suitable symmetric encryption algorithm.

In this embodiment, the encryption module 3b then asymmetrically encrypts the data key 11. In one configuration, the encryption module 3b uses digital enveloping to asymmetrically encrypt the data key 11 with one or more public keys to generate an enveloped data key 11a. Generally speaking, by 'digital enveloping' it is meant that a single data key which has been used to encrypt the data file is itself encrypted using one or many public keys. Any one of the private keys associated with the public key(s), can then be used to decrypt and reveal the single data key, which in turn can be used to decrypt the data file. In this embodiment, the enveloped data key 11a is a data or key package comprising an encrypted version of the data key 11 for each of the public keys associated with the envelope, and where each encrypted version of the data key is created by asymmetrically encrypting the data key with its associated public key. In this embodiment, the encryption module 3b digitally envelopes the data key 11 using the user public key 12 and the server public key 13 which are stored in the browser memory on the electronic user device. By way of example the data key 11 is asymmetrically encrypted using the public key 12, and then the data key 11 is asymmetrically encrypted using the server public key 13. Both encrypted versions of the data key are then provided in the enveloped data key 11a. By way of example only, the asymmetric encryption may be RSA encryption of any other suitable asymmetric encryption algorithm.

The user application 3 is then configured to transmit the encrypted document data file 10a and the encrypted data key 11a ('enveloped data key') to the server 1 for storage. The server application 4 on the server 1 is configured to store the encrypted document data file 10a and enveloped data key 11a in the file storage database 1g against a unique reference ID, along with storing relevant file information in the file information database such as which user uploaded the data file for review and which other registered or new invited users have been authorized to review the data file (i.e. file sharing permission information).

Digital Comment Encryption

Referring to FIG. 6B, the user side encryption of user posted comments when they are reviewing a data file is similar to the user side encryption of the uploaded data files. The user when reviewing a data file, e.g. a document data file, is displayed the data file in the user application 3 in the web browser. The user is then able to post or tag digital comments, via interaction with the graphical user interface of the user application, against one or more aspects of the displayed content. For example, the user may link or tag a comment post to any particular part (e.g. word, sentence, paragraph, graphic or the like) of the displayed document via a comment bubble or similar and connector line to the part of the document or via any other suitable graphical linking technique for linking a comment with a part of a displayed document. The digital comment data may often be in the form of text that is typed into the graphical user interface or may be provided in other formats such as, but not limited to, audio and/or video comments. The encryption module 3b of the user application 3 (e.g. JavaScript application running in the web browser) is configured to encrypt the digital comment 20, and then the encrypted comment 21a is sent to the server 1 over the data network 30 for processing and storage. Again, the data transmission may be over a SSL encrypted link.

When the user posts a digital comment, the user key module 3a of the user application 3 generates a random data key 21, such as a 2048 or 4096 bit data key. The encryption module 3b of the user application 3 is configured to then symmetrically encrypt the digital comment 20 with the generated data key 21 to generate an encrypted digital comment 20a.

As with the data file encryption process of FIG. 6A, the encryption module 3b is configured to the digitally envelope the data key 21 with one or more public keys, for example in this embodiment the user public key 12 and server public key 13 to generate an enveloped data key 21a. Again, the enveloped data key 21a is a data or key package comprising one version of the data key 21 that has been asymmetrically encrypted with the user public key 12 and one version of the data key that has been asymmetrically encrypted with the server public key 13.

The user application 3 is then configured to transmit the encrypted digital comment 20a and the associated enveloped data key 21a to the server 1 for storage. The server application 4 on the server 1 is configured to store the encrypted digital comment 20a and enveloped data key 21a in the comments database 1g against a unique reference ID. In one configuration, the server is configured to link the reference IDs of the comments with the reference ID of the associated data file and store this information in the file information database 1g on the server 1.

4.4 Server Side Decryption, File Conversion, and Re-Encryption

Overview

As explained above, the user application 3 encrypts each item of data content (e.g. data files and digital comments) with a unique data key 11,21, and then encrypts or digitally envelopes the data key 11,21 with the user public key 12 and the server public key 13 to generate a digitally enveloped data key 11a,21a. The collaboration system is configured to enable one or more other authorized users to access and review the data content, e.g. the data file and its associated comments, if any. Therefore, a second user or reviewer, different to the first user (e.g. author and uploader of a data file to the server for review), may require access to the encrypted data content 10a,20a being stored on the server. To access the encrypted data content 10a,20a the second user must have correct decryption keys in order to decrypt the encrypted data 10a,20a. As the user application 3 operating on each electronic user device only stores one user key pair 12,14 unique to the user and the server public key 13, difficulty arises when a plurality of authorized users all need to view data content encrypted by the first user as none of them would have the first user's decryption key. In view of this, the collaboration system is configured such that each newly uploaded item of encrypted data content must have its encryption and decryption information (e.g. the digitally enveloped data key) modified at the server 1 to allow other authorized reviewers to each use their own decryption keys to decrypt and access the data content. In this embodiment, this key managing task is performed by the server key module 4c. In addition to processing by the server key module, some items of data content (e.g. newly uploaded data files that are not in a browser-viewable format) may also need to be modified by a file converting module 4d on the server.

In this embodiment, the server application 4 comprises one or more service queues 4b which contain a list of reference IDs associated with the items of stored data content that need further processing by the server key module 4c and/or file converting module 4d. In this embodiment, data processing module 4a of the server 1 is configured to allocate reference IDs of the following items of data content to the service queue or queues:

newly uploaded encrypted data files—which need to have the other authorized users added to the enveloped data key associated with the encrypted data file by the key server module 4c so the authorized users can decrypt and view the data file, and also new data files may need to be converted by the file converter module 4d into a browser-viewable format, newly uploaded comments—which need to have the other authorized users associated with the data file being commented on added to the enveloped data key associated with the encrypted comment so the authorized users can decrypt and view the comment when reviewing the data file, and any items of data content (e.g. data files or digital comments) in which the sharing permissions have been updated to add or remove an authorized user to view the data file and any associated comments, as this requires the enveloped data keys associated with the data file and any associated comments to be updated or modified.

In this embodiment, the server application 4 on the server provides a dedicated service queue 4b for data files that need processing, and a dedicated service queue 4b for comments that need processing. In this embodiment, the server is provided with one or more security private platforms 1*b* that comprise a server key module 4*c* and file converter module 4*d* for processing the data file service queue, and one or more security private platforms 1*b* that comprise a server key module 4*c* for processing the comment server queue. The data file security private platforms have the added capability of file conversion and then encrypting of the converted data files, compared to the security private platforms for processing digital comments, which are typically text only and do not require file conversion.

However, it will be appreciated that in alternative embodiments the service queues may be combined into a single service queue, and the single service queue may be processed by either one or multiple security service platforms 1*b*, where the security service platforms are dedicated to processing a particular types of data content (e.g. data files or comments) or where the platforms are capable of processing all types of data content.

More detail on the server key module 4*c* and file converting module 4*d* is provided below. In particular, a the processing of a data file by a security private platform 1*b* is described with reference to FIGS. 7-9, and the processing of a digital comment by a security private platform 1*b* is described with reference to FIG. 10.

Decryption, Conversion, and Re-Encryption of Data Files

Figure 7:
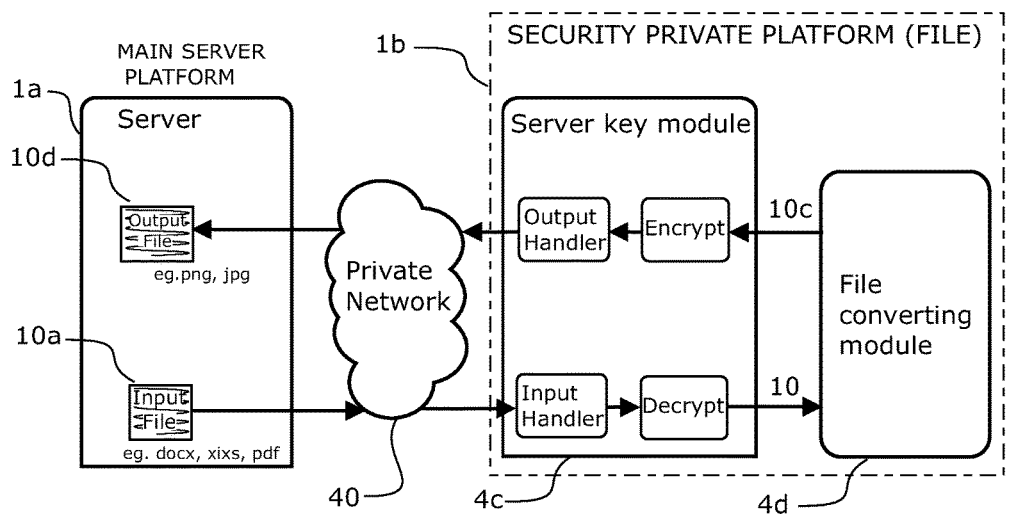
FIG. 7 shows an overview schematic diagram of the data flow and process of the server side decryption and re-encryption process for a newly uploaded data file in accordance with an embodiment.

With reference to FIG. 7, an overview of the processing carried out by a security private platform 1*b* dedicated to data files will be explained. In this embodiment, this security private platform provides a data file conversion process or engine for uploaded encrypted data files. The input to the security private platform is an encrypted data file (e.g. retrieved from the file storage database 1*g* on the server 1 by an input interface or input handler of the server key module 4*c*). The input handler comprises a queue manager that is configured to monitor a service queue for tasks. The service queue is a one-way queue that has reference IDs to data content (e.g. data files) requiring processing placed on it by the main server platform 1*a*. Once a reference ID of the data file has been retrieved or pulled from the incoming queue, the security private platform 1*b* then requests or obtains any further information required such as the users authorised to view the data file, the new file format desired, and the actual encrypted data file from the main server platform 1*a*, for example via an API call.

The input data file can represent any type of electronic media content and may be in any file type or format such as, but not limited to, Microsoft Word file types, Microsoft Excel file types, Microsoft Power Point file types, Acrobat PDF files, PNG image files, JPG image files or other file formats. The data file conversion process is used to convert files types that are not suitable for direct browser viewing into browser-viewable formats or file formats which allow direct browser display. The input data file 10*a* retrieved by the security private platform has already been encrypted using a symmetrical encryption algorithm with a data key, where the data key has in turn been encrypted (digitally enveloped) with one or more public key(s) using an asymmetric encryption algorithm to generate an enveloped data key. The server key module 4*c* of the security private platform is configured to decrypt the input data file and pass the decrypted data file 10 to the file converting module or engine 4*d*. The file converting module 4*d* is configured to produce or generate a converted data file or files 10*c* that are browser-viewable and then passes those back to the server key module for re-encryption. The server key module 4*c* re-encrypts the converted data files, including adding any necessary user public keys to their respective enveloped data key or data keys, and outputs, via an output handler, the re-encrypted converted data file(s) 10*d* back to the server 10*b* for storage and access (e.g. display) by authorized users.

Figure 8:
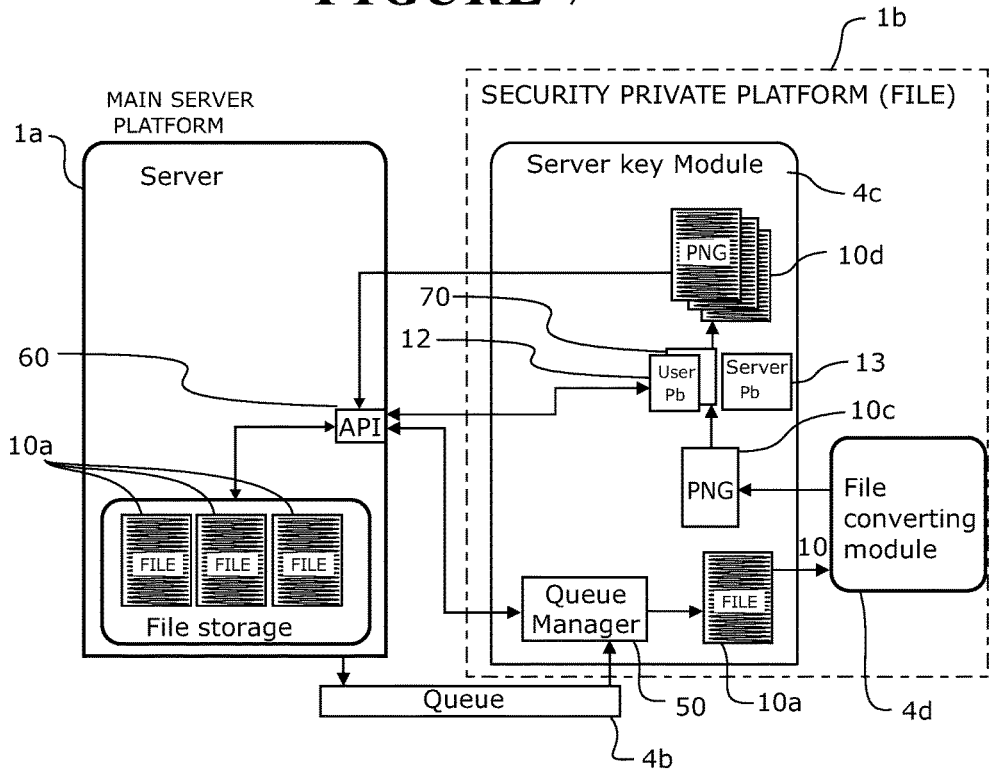
FIG. 8 shows a schematic diagram of the data flow and process of FIG. 7 implementing the server side decryption and re-encryption process for a newly uploaded data file in the form of a text document, including the file conversion process into multiple graphics files, in accordance with an embodiment.

With reference to FIG. 8, further detail on the typical operation of the security private platform 1*b* of FIG. 7 will be described with reference to processing a data file in the form of a multi-page Microsoft Word Document or PDF document. Firstly, the queue manager 50 of the server key module 4*c* accesses the data file service queue 4*b* and picks up a reference ID from the queue that represents an encrypted data file that needs processing. The data file 10*a* associated with the reference ID is retrieved by the server key module from file storage 1*g* on the server 1, for example by the queue manager sending a request or otherwise interacting with a server API 60. Additional information such as any additional authorized users' public keys and file conversion information is also retrieved by the server key module 4*c* via interaction with or querying the server API 60. For example, the additional authorized users' public keys correspond to those users that have been granted access rights to the data file, and the file conversion information may, for example, indicate to covert the multi-page document into separate image files, e.g. PNG files, one file per page.

The server key module 4*c* is configured to decrypt the encrypted data file 10*a* using the server private key. For example, the server private key is used to decrypt the encrypted or digitally enveloped data key associated with the encrypted data file 10*a* (as the envelope contains a version of the data key that has been asymmetrically encrypted with the server public key), and then the decrypted data key is used to decrypt the encrypted data file 10*a* (which was symmetrically encrypted with the data key originally). The server private key is stored in memory or storage on the or each security private platform. The decrypted data file 10 is then passed to the file converting module 4*d* that is configured to covert the data file 10 into another format, for example a format that is browser-viewable or some other required format. The file converting module may comprise one or multiple different file converting sub-modules that either work alone or in combination to generate the required output file format. By way of example, the file converting module 4*d* may comprise a Raster Image Processor (RIP) such as Ghostscipt, or another type of file transposer such as Microsoft SharePoint which can turn Microsoft Word files into PDFs, and then the RIP sub-module can be applied to turn the PDFs into PNGs. As mentioned, the file converting module can have several sub-modules for accepting and converting files from one type to another suitable for display in the browser. Typically, the file converting module 4*d* is configured to convert a multi-page document into several single or individual page files or images, for example an 8-page Microsoft Word document is converted into 8 single page PNG files.

In this example, the decrypted data file is a multi-page Microsoft Word document or PDF document. Some browsers may not support displaying these files directly and may require plug-ins or additional application programs to be installed. In this embodiment, the file converting module 4*d* is configured to convert the Microsoft Word document or PDF document into a plurality of image files 10*c* such as PNGs 10*c*. The converted data files 10*c* are then passed back from the file converter module 4*d* to the server key module 4*c*.

In this embodiment, the server key module 4*c* is then invoked to symmetrically encrypt each of the individual PNG files 10*c* using newly generated data keys. In this embodiment, the data keys may be 2048 bit data keys, one data key being generated for each PNG file 10c. Each PNG file 10c is symmetrically encrypted with a respective one of the generated data keys. Each data key associated with the encrypted PNG files 10c is then encrypted or digitally enveloped using server public key 13, user public key 12 (e.g. the author of the data file), and any additional user public keys 70 corresponding to users that are authorized to access the file. The enveloped data keys and their associated encrypted PNGs 10d are then delivered back to the server for storage in the file storage database against the reference ID originally supplied as a reference in the service queue. The result of this process is that the PNG files can then be accessed and viewed by the author and authorized users (reviewers) in their browser directly, as each of these users has a private key that can decrypt the enveloped data keys, with the decrypted data keys then being used to decrypt the data files. In alternative embodiments, new data keys need not necessarily be generated for encrypting each of the individual converted files, in this case the individual PNG files. For example, in an alternative embodiment, the original decrypted data key used to encrypt the original file (e.g. the Microsoft Word or PDF document file) can be re-used as the data key used to encrypt all of the PNG files. In another alternative embodiment, a single new data key may be generated for encrypting all of the PNG files.

In this embodiment, the server key module 4c requests reference IDs from the service queue 4b and other information from the main server platform to facilitate the processing carried out on the security private platform, such as file conversion and creating re-enveloped data keys with all the required public keys to enable access by the authorized users. In other words, the data communication request between the server key module 4c of the security private platform 1b and the other modules on the main server platform 1a is unidirectional—the server key module 4c can request data from modules on the main server platform and then send output back to the main server platform for storage, but the main server platform cannot directly request data from the modules on the security private network. As previously mentioned, in this embodiment the server key module 4c resides and operates on one or more private machines which have no incoming access from the internet. These machines are kept in a private network. By 'private network' it is meant a network that uses private IP address space and which are not globally delegated, meaning that data packets addressed to private IP addresses cannot be transmitted through the public internet.

Figure 9:
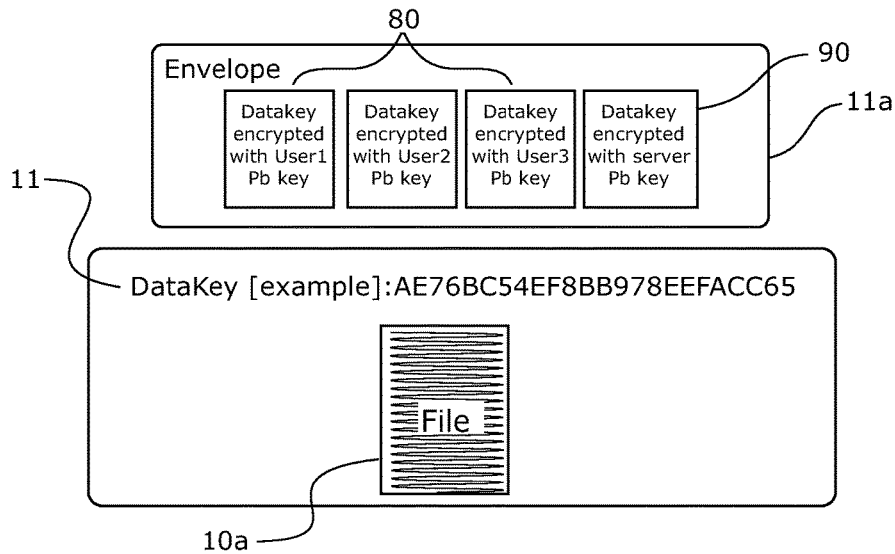
FIG. 9 shows an exemplary data key enveloped with a plurality of user public keys and a server public key in accordance with an embodiment.

In the above example, the server key module 4c invoked the file converting module 4d to convert the decrypted data file 10 into a different format such as a browser-viewable file format, before re-encrypting the converted data file. However, the file converting module need not be invoked in every instance, and is optional depending on if conversion is required. For example, in this embodiment, the file conversion process will not be needed if the data file being processed is already in a browser-viewable format, or if the data file being processed has already been converted into a browser-viewable format. In such situations, the server key module 4c on the security private platform may be configured to simply add or remove user public keys to the enveloped data key in accordance with the desired or updated sharing permissions associated with the data file itself, without modifying the encrypted data file itself. For example, the server key module may simply decrypt the enveloped data key associated with the data file with the server private key and then re-envelop the decrypted data key or generate a new or modified enveloped data key with the server public key and the new set of required user public keys associated with the authorized users (which may have been modified to add or remove users). By way of example, FIG. 9 shows an example of a data file 10a symmetrically encrypted with a data key 11, and an enveloped data key 11a, which comprises multiple versions of the data key, each version being asymmetrically encrypted by a respective user public key of users 1-3 or the server public key. This means the enveloped data key 11a can only then be decrypted by any of the private keys of the users 1-3 or by the server private key. The system is configured such that the enveloped data key associated with data content (e.g. data files or digital comments) is updated to comprise only data key versions that have been encrypted by public keys associated with authorized users of that data content and the server public key.

Decryption and Re-Encryption for Comments

Figure 10:
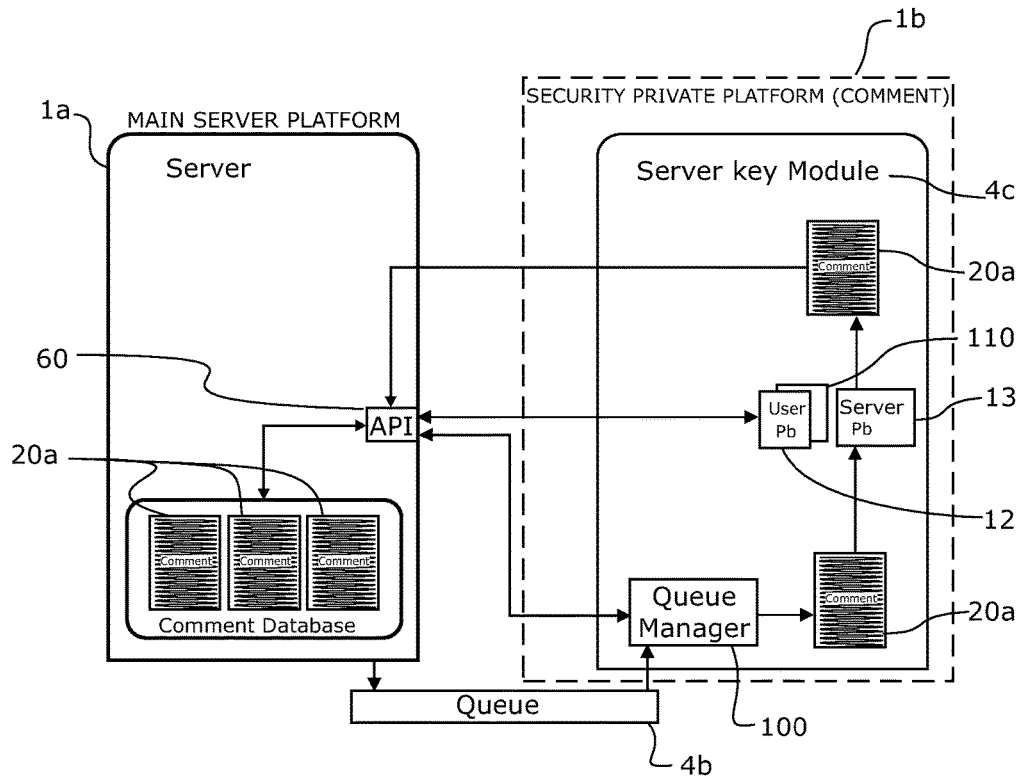
FIG. 10 shows a schematic diagram of the data flow and process of the server side decryption and re-encryption process for a newly posted comment relating to a data file, such as a text document, being proofed in accordance with an embodiment.

Referring to FIG. 10, an example of the processing carried out by a security private platform dedicated to processing digital comments will be explained. This example shows the addition of one or more additional user public keys to an encrypted data comment, for example in the scenario where one or more additional users have been granted access to a data file associated with the encrypted data comment and therefore require access to its associated comments also. The overall configuration and process is similar to that described in FIGS. 7-9 in the context of data files that do not require file conversion, i.e. just modification of the enveloped data key is required.

The queue manager 100 of the server key module 4c access the comment service queue 4b and picks up a reference ID from the queue that represents an encrypted comment that needs processing. The encrypted comment 20a associated with the reference ID is retrieved by the server key module from the comment storage database 1g on the server, for example by the queue manager sending a request or otherwise querying the server API 60. Additional information such as additional authorized users' public keys are also retrieved by the server key module 4c via querying the server API 60. For example, the additional authorized users' public keys correspond to those users that have been granted access rights to the digital comment and typically the data file associated with the digital comment.

The server key module 4c is configured to decrypt the enveloped data key associated the encrypted data file 20a. The decrypted data key is then re-enveloped or a new or modified enveloped data key is generated with the server public key and the user public keys associated with the authorized users granted access to the digital comment. For example, in this case, the decrypted data key is re-enveloped with the user public key 12, server public key 13, and the one or more additional user public keys 110 correspond to the new users that have been authorized access. The encrypted comment 20a and re-enveloped data key are then delivered back to the comment database 1g on the main server platform 1a for storage and access (e.g.) display by the updated authorized users. It will be appreciated that this process can be repeated for adding further authorized users or removing authorized users. Removing an authorized user to revoke their access to a digital comment involves re-enveloping or otherwise generating a new or modified enveloped data key without the revoked user's public key, for example by deleting or removing the version of the data key that was encrypted with the revoked user's public key from the envelope.

4.5 User Access to Data Content on the Server

Figure 11:
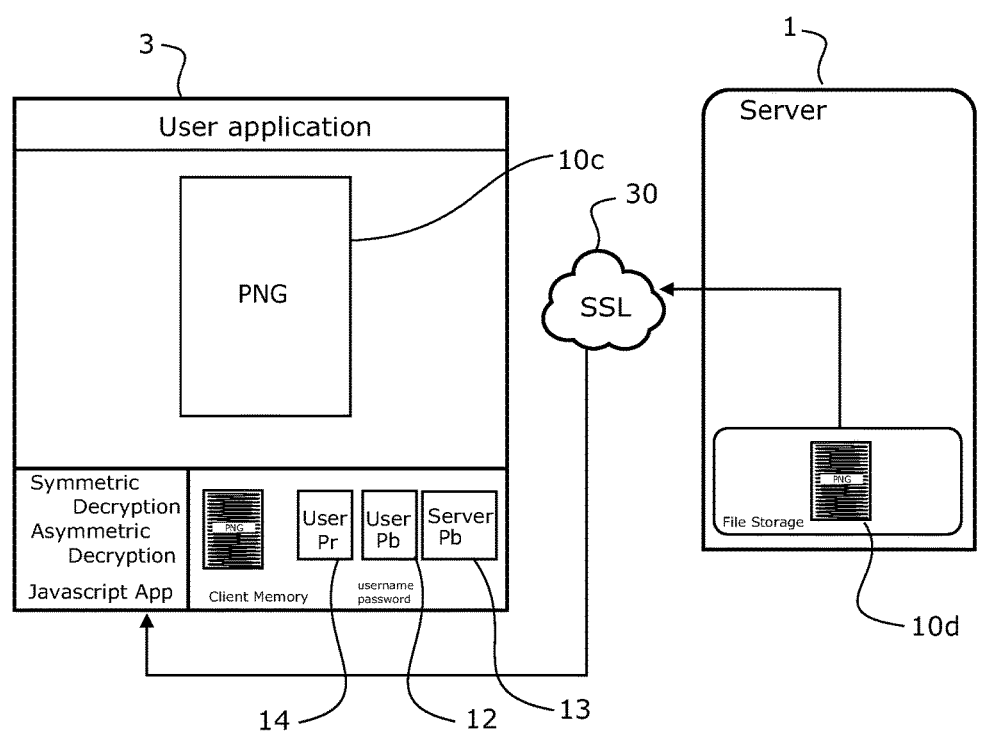
FIG. 11 shows a schematic diagram of the data flow and process of stored encrypted data content on the server, such as a stored data file, being delivered to an electronic user device for decryption and display to a user in accordance with an embodiment.

FIG. 11 shows how an authorised user may access the encrypted data content stored on the server 1. This example is described in the context of an authorized user viewing the document data file that was converted into multiple PNG image files 10d on the server with reference to FIGS. 7-9. In that example, the original encrypted document data file 10a was converted into a PNG file format and re-encrypted.

In this embodiment, the user application 3 on the electronic user device 5 requests the encrypted data file 10d from the server 1. The server responds by retrieving the encrypted data file 10d from the file storage database 1g and sends it to the user application 3 on the electronic user device 5 over the data network 30, for example the internet using SSL. Once the converted and re-encrypted data file 10d arrives at the electronic user device 5, the user application 3 invokes the decryption module 3c to decrypt the enveloped data key associated with the data file 10d using the user private key 14. The decryption module 3c is then configured to decrypts the data file 10d using the decrypted data key, and the decrypted data file 10c is then displayed to the user in their browser. The same process applies when the user application retrieves, decrypts and displays any digital comments associated with such data files.

4.6 User Application Interface

FIGS. 12-15 show screen captures of an exemplary graphical user interface of a user application 3.

Figure 12:
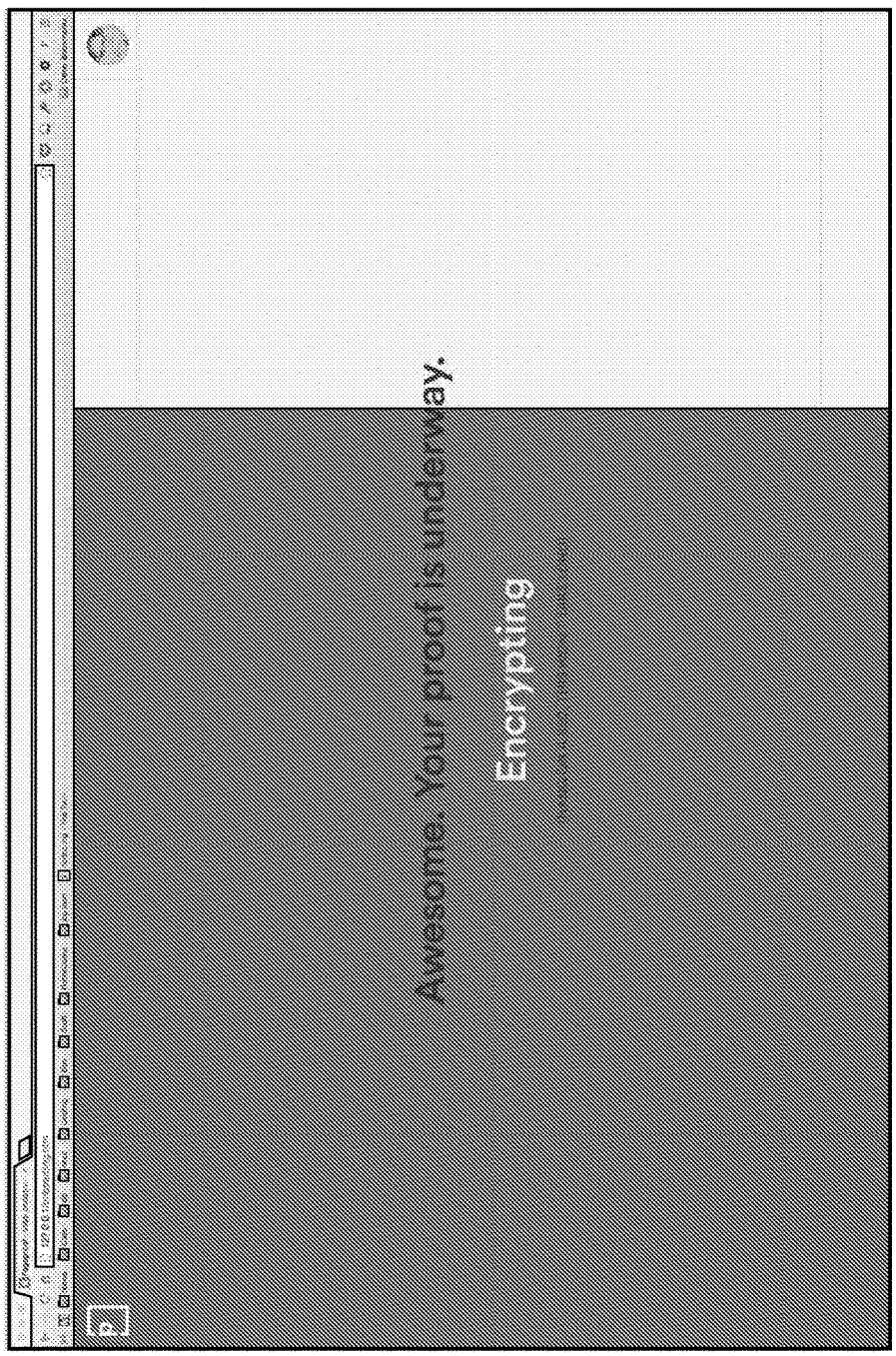
FIG. 12 shows a screen-shot of an exemplary user application browser interface displayed on an electronic user device where the user application is encrypting a data file before uploading to the server for proofing in accordance with an embodiment.

FIG. 12 shows a user has already selected some data content 10 to be uploaded to the server 1 and the encryption module (not shown) is performing its encryption tasks.

Figure 13:
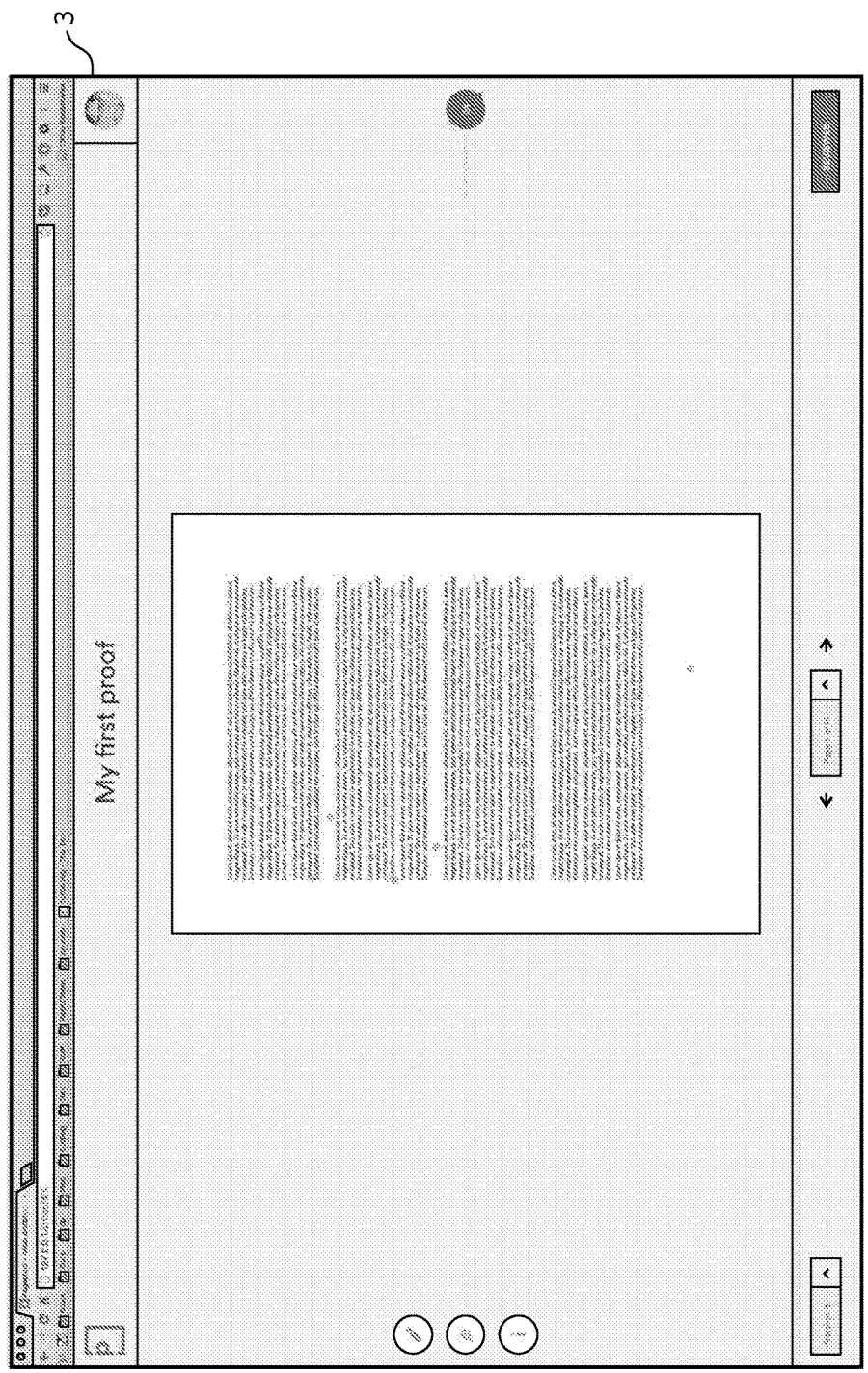
FIG. 13 shows a screen-shot of an exemplary user application browser interface displaying data content, such as a text document, from the server that has been decrypted for display to a user in accordance with an embodiment.

FIG. 13 shows the user application 3 is displaying to a user the decrypted data content 10 in a web browser. The user can navigate different pages of the data content 10 by simply clicking on the left and right arrows near the bottom of the page.

Figure 14:
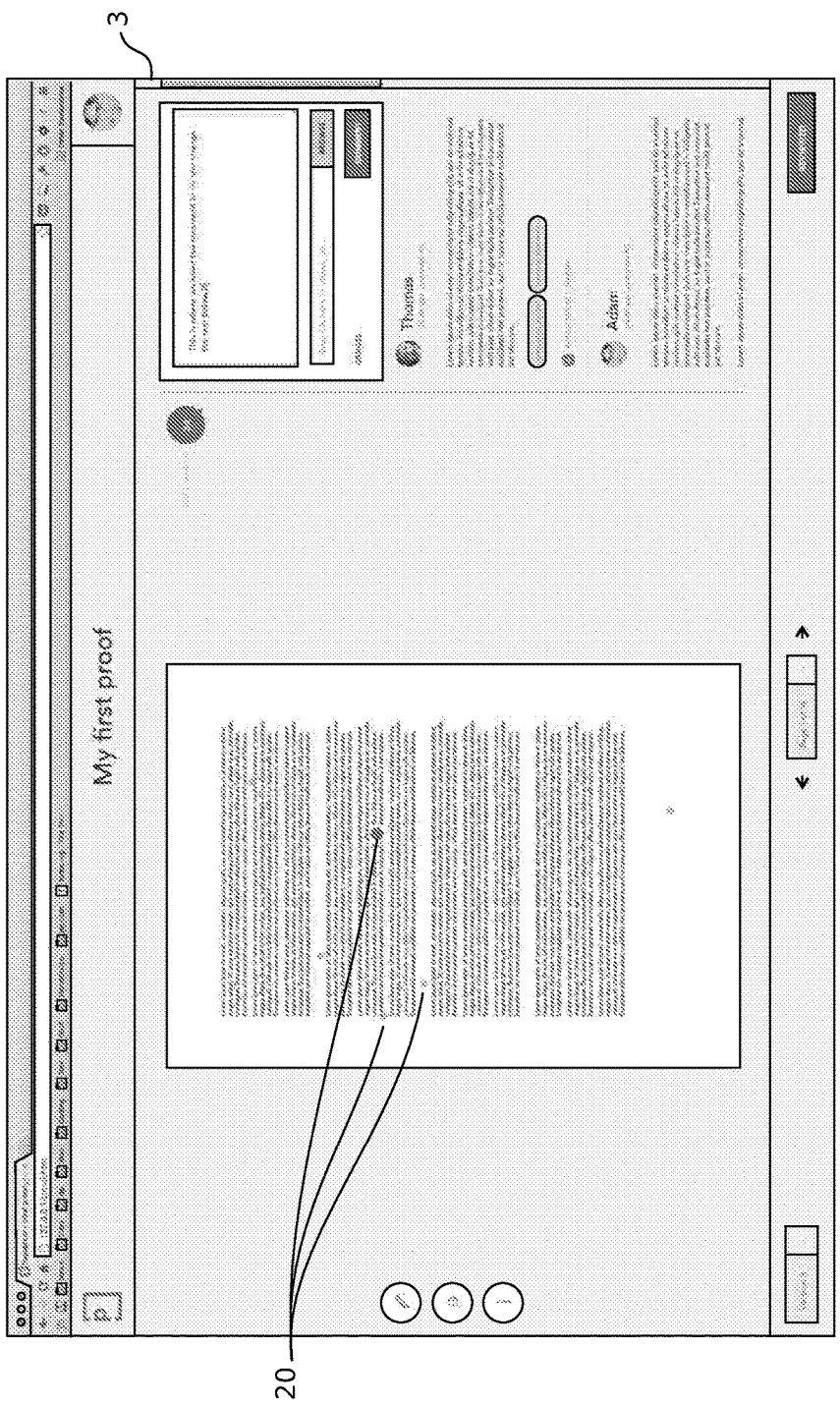
FIG. 14 shows the screen-shot of FIG. 13 with an expanded comment field displaying a thread of comments relating to an aspect of the text document being proofed from a plurality of reviewers in accordance with an embodiment.

FIG. 14 shows an example of the interface function enabled by the interface module 3d of the user application 3. A user is able to create text content (for a digital comment) in the browser window directly and associate or link that comment with a part of or point on the displayed document, or can add comments to an existing comment thread. At the click of 'comment', the user application 3 encrypts the text content and sends the encrypted content to the server as described above. The user application 3 conveniently indicates to the reviewers where comments are left by other reviewers with graphical indications or symbol, such as dots or similar. By clicking or maneuvering a mouse over the dots 20, the comments are displayed on the right side of the browser window.

Figure 15:
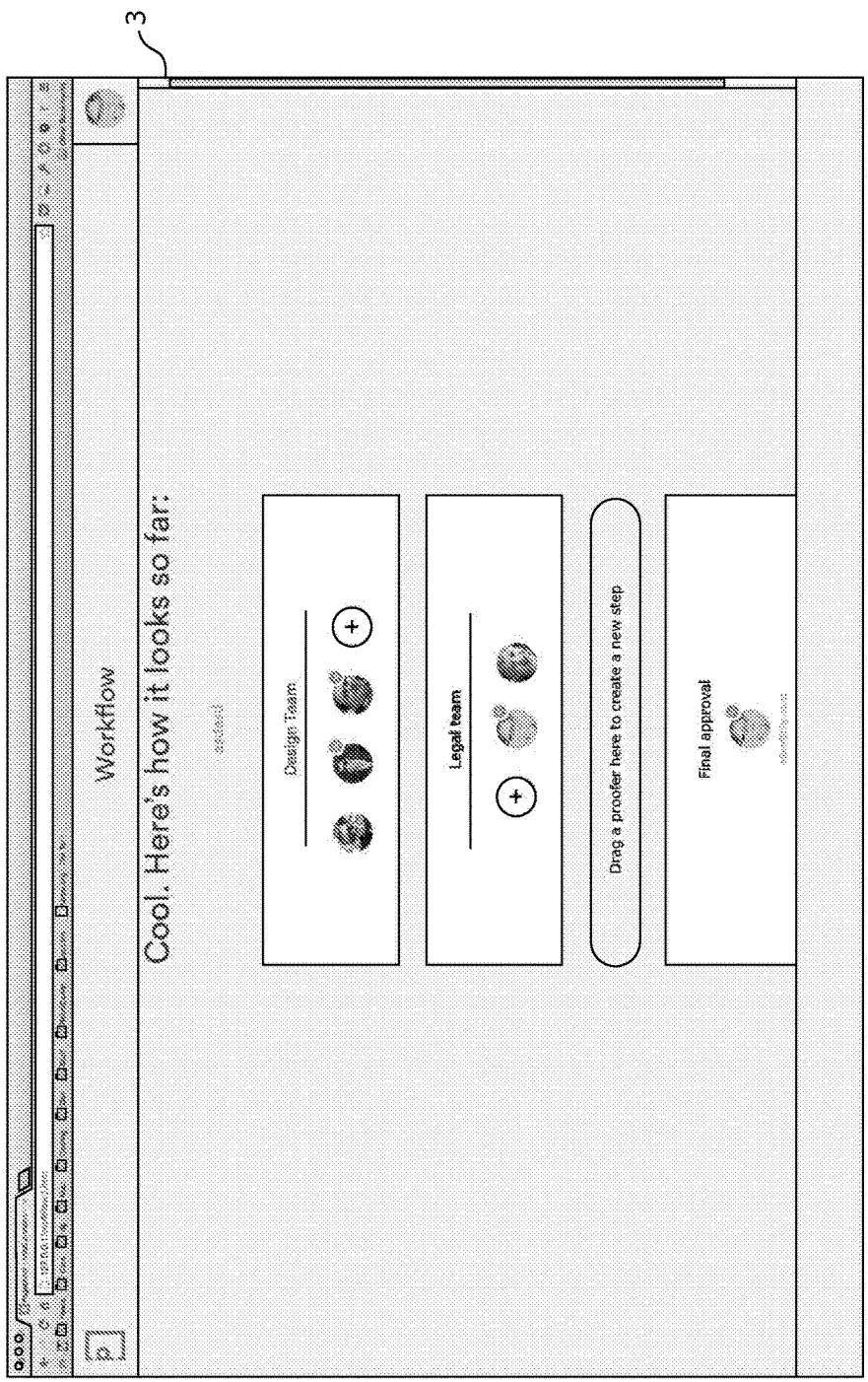
FIG. 15 shows a screen-shot of a configured workflow for a proofing and approval process for a data file, such as a text document, by a group of reviewers in accordance with an embodiment.

FIG. 15 illustrates an exemplary screen shot of a workflow configuration for the review of a particular document or set of documents where a design team (authors) creates the work to be proof read or checked by the legal team (reviewers), and a user performs the final approval. The user application 3 allows a user to add reviewers to either the design team or the legal team by clicking on the '+' button, after which the server application will receive the request and modifies document encryption/decryption information at the server so the new user can also decrypt and access encrypted data content (e.g. document data file and any associated comments).

5. General

Embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In the foregoing, a storage medium may represent one or more devices for storing data, including read-only memory (ROM), random access memory (RAM), magnetic disk storage mediums, optical storage mediums, flash memory devices and/or other machine readable mediums for storing information. The terms "machine readable medium" and "computer readable medium" include, but are not limited to portable or fixed storage devices, optical storage devices, and/or various other mediums capable of storing, containing or carrying instruction(s) and/or data.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein.

A general purpose processor may be a microprocessor, but in the alternative, the processor may be any conventional processor, controller, microcontroller, circuit, and/or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

One or more of the components and functions illustrated the figures may be rearranged and/or combined into a single component or embodied in several components without departing from the invention. Additional elements or components may also be added without departing from the invention. Additionally, the features described herein may be implemented in software, hardware, as a business method, and/or combination thereof.

In its various aspects, the invention can be embodied in a computer-implemented process, a machine (such as an electronic device, or a general purpose computer or other device that provides a platform on which computer programs can be executed), processes performed by these machines, or an article of manufacture. Such articles can include a computer program product or digital information product in which a computer readable storage medium containing computer program instructions or computer readable data stored thereon, and processes and machines that create and use these articles of manufacture.

The foregoing description of the invention includes preferred forms thereof. Modifications may be made thereto without departing from the scope of the invention as defined by the accompanying claims.

The invention claimed is:

1. A method of sharing collaborative data between registered users in an online collaboration system, the collaboration system comprising a server and one or more electronic user devices that are capable of data communication with the server over a data network, each registered user being allocated a unique asymmetric key pair comprising a user public key and a user private key for encryption and decryption, the method executed on the server by one or more processors comprising:

receiving encrypted data at the server over the data network from a first user via an electronic user device operated by the first user, wherein the encrypted data has been encrypted on the electronic user device and comprises:

encrypted data content generated by symmetric encryption of the data content with a data key, and an associated enveloped data key comprising encrypted versions of the data key generated by asymmetric encryption of the data key with the first user's public key and a server public key respectively;

decrypting the enveloped data key associated with the encrypted data content on the server using a server private key, wherein the server private key and the server public key form an asymmetric key pair;

generating a new or modified enveloped data key for the encrypted data content comprising asymmetrically encrypted versions of the data key generated by the first user's public key, the server public key, and one or more additional unique public keys of one or more additional authorized users that have granted access to the data content; and storing the new or modified enveloped data key with the encrypted data content in the server to thereby enable access to the data content by the first user and the one or more additional authorized users using their respective user private keys.

2. The method according to claim 1 further comprising:
decrypting the encrypted data content using the decrypted data key;
converting the decrypted data content into a different file format than its original file format;
re-encrypting the converted data content using the decrypted data key or a new data key or keys; and
storing the re-encrypted converted data content with an associated new or modified enveloped data key or keys on the server to enable access to the data content by the first user and the one or more additional authorized users using their respective user private keys.

3. The method according to claim 2, wherein before the step of generating a new or modified enveloped data key, the method further comprising:

re-encrypting the converted data content using a new data key or data keys, and wherein the generated new or modified enveloped data key or keys comprises asymmetrically encrypted versions of the new data key or keys with the first user's public key, the server public key, and the unique public keys of one or more additional authorized users that have granted access to the data content; and storing the re-encrypted converted data content with its associated new or modified enveloped data key or keys on the server to enable access to the data content by the first user and the one or more additional authorized users using their respective user private keys.

4. The method according to claim 3 wherein converting the decrypted data content into a different file format than its original file format comprises generating more than one new converted files of a different format that collectively representing the original data content, and the method comprises:

re-encrypting each of the new converted files with its own respective unique data key;

generating new enveloped data keys for each of the respective encrypted new converted files using the first user's public key, the server public key, and the public keys of the one or more additional authorized users that have been granted access to the data content; and storing the re-encrypted new converted data files with their respective associated new enveloped data keys on the server to enable access to the data content by the first user and the one or more additional authorized users using their respective user private keys.

5. The method according to claim 2 wherein the decrypted data content is a multi-page document file, and the method comprises converting the multi-page document file into a plurality of single-page document files of a different format.

6. The method according to claim 2 wherein the method comprises converting the decrypted data content into a browser-viewable file format that allows for direct browser display on an electronic user device.

7. The method according to claim 6 wherein the method comprises converting the decrypted data content into an image or text file format.

8. The method according to claim 2 wherein the server comprises a main server platform that is in accessible data communication with the one or more electronic user devices over the data network, and one or more security private platforms that have a private data communication link to the main server platform, and wherein the one or more security private platforms retrieve the encrypted data from the main server platform and perform the steps of decrypting the encrypted data content, converting the encrypted data content into a different file format, re-encrypting the converted data content, and then transmitting the re-encrypted converted data content with its associated new or modified enveloped data key or keys back to the main server platform for storage.

9. The method according to claim 8 wherein the one or more security private platforms unilaterally control the data communication with the main server platform in that the security private platforms are configured to initiate data communication with the main server platform by requesting data and sending processed data back to the main server platform.

10. The method according to claim 8 further comprising generating a service queue or queues on the main server platform comprising data identifying items of received encrypted data that require further processing, and monitoring of the one or more service queues by the one or more security private platforms to identify items of encrypted data to be retrieved from the main server platform for processing.

11. The method according to claim 8 wherein the encrypted data content and associated enveloped data key or keys are stored on the main server platform.

12. The method according to claim 1 wherein the server comprises a main server platform that is in accessible data communication with the one or more electronic user devices over the data network, and one or more security private platforms that have a private data communication link to the main server platform, and wherein the one or more security private platforms retrieve the encrypted data from the main server platform and perform the steps of decrypting the enveloped data key, generating the new or modified enveloped data key, and then transmitting the new or modified enveloped data key and encrypted data content back to the main server platform for storage.

13. The method according to claim 1 wherein the encrypted data content comprises a data file or files comprising electronic media content for display or playback.

14. The method according to claim 13 wherein the electronic media content comprises any one or more of the following: text, graphics, audio, and/or video.

15. The method according to claim 1 wherein the encrypted data content comprises a digital comment or comments uploaded to the server by an authorized user relating to other encrypted data content the user has been granted access to.

16. The method according to claim 15 wherein the digital comment is in the form of any of the following: text, audio, and/or video.

17. A server for sharing collaboration data in an online collaboration system, the server being accessible for data communication by one or more electronic user devices over a data network, each registered user being allocated a unique asymmetric key pair comprising a user public key and a user private key for encryption and decryption, the server comprising one or more processors being configured to:
receive encrypted data at the server over the data network from a first user via an electronic user device operated by the first user, wherein the encrypted data has been encrypted on the electronic user device and comprises:
encrypted data content generated by symmetric encryption of the data content with a data key, and
an associated enveloped data key comprising encrypted versions of the data key generated by asymmetric encryption of the data key with the first user's public key and a server public key respectively,
decrypt the enveloped data key associated with the encrypted data content on the server using a server private key, wherein the server private key and the server public key form an asymmetric key pair;
generate a new or modified enveloped data key for the encrypted data content comprising asymmetrically encrypted versions of the data key generated by the first user's public key, the server public key, and one or more additional unique public keys of one or more additional authorized users that have granted access to the data content; and
store the new or modified enveloped data key with the encrypted data content in the server to thereby enable access to the data content by the first user and the one or more additional authorized users using their respective user private keys.

18. The server according to claim 17 being further configured to:
decrypt the encrypted data content using the decrypted data key;
convert the decrypted data content into a different file format than its original file format;
re-encrypt the converted data content using the decrypted data key or a new data key or keys; and
store the re-encrypted converted data content with an associated new or modified enveloped data key or keys on the server to enable access to the data content by the first user and the one or more additional authorized users using their respective user private keys.

19. The server according to claim 18 wherein before the server generates a new or modified enveloped data key, the server being further configured to:
re-encrypt the converted data content using a new data key or data keys, and wherein the server is configured to generate the new or modified enveloped data key or keys comprising asymmetrically encrypted versions of the new data key or keys with the first user's public key, the server public key, and the unique public keys of one or more additional authorized users that have granted access to the data content; and
store the re-encrypted converted data content with its associated new or modified enveloped data key or keys on the server to enable access to the data content by the first user and the one or more additional authorized users using their respective user private keys.

20. The server according to claim 19 wherein the server is configured to convert the decrypted data content into a different file format than its original file format by generating more than one new converted files of a different format that collectively representing the original data content, and the server being further configured to:
re-encrypt each of the new converted files with its own respective unique data key;
generate new enveloped data keys for each of the respective encrypted new converted files using the first user's public key, the server public key, and the public keys of the one or more additional authorized users that have been granted access to the data content; and
store the re-encrypted new converted data files with their respective associated new enveloped data keys on the server to enable access to the data content by the first user and the one or more additional authorized users using their respective user private keys.

21. The server according to claim 18 wherein the decrypted data content is a multi-page document file, and the server is configured to convert the multi-page document file into a plurality of single-page document files of a different format.

22. The server according to claim 18 wherein the server is configured to convert the decrypted data content into a browser-viewable file format that allows for direct browser display on an electronic user device.

23. The server according to claim 22 wherein the server is configured to convert the decrypted data content into an image or text file format.

24. The server according to claim 18 wherein the server comprises:
a main server platform that is in accessible data communication with the one or more electronic user devices over the data network; and
one or more security private platforms that have a private data communication link to the main server platform, and wherein the one or more security private platforms that are configured to retrieve the encrypted data from the main server perform, decrypt the encrypted data content, convert the encrypted data content into a different file format, re-encrypt the converted data content, and then transmit or transfer the re-encrypted converted data content with its associated new or modified enveloped data key or keys back to the main server platform for storage.

25. The server according to claim 24 wherein the one or more security private are configured with unilateral control the data communication with the main server platform in that the security private platforms are configured to initiate data communication with the main server platform by requesting data from and sending processed data back to the main server platform.

26. The server according to claim 24 wherein the main server platform is configured to generate a service queue or queues comprising data identifying items of received encrypted data that require further processing, and wherein the one or more security private platforms are configured to monitor the one or more service queues and retrieve the identified items of encrypted data from the main server platform for processing based on the service queue or queues.

27. The server according to claim 24 wherein the encrypted data content and associated enveloped data key or keys are stored on the main server platform.

28. The server according to claim 17 wherein the server comprises:
 a main server platform that is in accessible data communication with the one or more electronic user devices over the data network; and
 one or more security private platforms that have a private data communication link to the main server platform, and wherein the one or more security private platforms are configured to retrieve the encrypted data from the main server platform and are configured to decrypt the enveloped data key, generate the new or modified enveloped data key, and then transmit or transfer the new or modified enveloped data key and encrypted data content back to the main server platform for storage.

29. The server according to claim 17 wherein the encrypted data content comprises a data file or files comprising electronic media content for display or playback.

30. The server according to claim 29 wherein the electronic media content comprises any one or more of the following: text, graphics, audio, and/or video.

31. The server according to claim 17 wherein the encrypted data content comprises a digital comment or comments uploaded to the server by an authorized user relating to other encrypted data content the user is authorized to access.

32. The server according to claim 31 wherein the digital comment is in the form of any of the following: text, audio, and/or video.

33. A method of accessing shared collaborative data by a registered user in an online collaboration system, the collaboration system comprising a server and one or more electronic user devices that are capable of data communication with the server over a data network, each registered user being allocated a unique asymmetric key pair comprising a user public key and a user private key for encryption and decryption, the method executed by a processor of the electronic user device comprising:
 receiving from the server over the data network and storing in temporary memory on the user device the registered user's encrypted user private key, user public key, and a server public key;
 decrypting the encrypted user private key using a password input by the registered user into the user device and storing the decrypted user private key in temporary memory;
 requesting and receiving an item of encrypted data from the sever over the data network in response to user interaction with the user device, the registered user being authorised to access the item of encrypted data, the encrypted data comprising:
  encrypted data content generated by symmetric encryption of the data content with a data key, and
  an associated enveloped data key comprising encrypted versions of the data key generated by asymmetric encryption of the data key with each of the user public keys of authorized registered users that have been granted access to the item of encrypted data content and a server public key respectively;
 decrypting the enveloped data key with the decrypted user private key;
 decrypting the encrypted data content with the decrypted data key; and
 presenting the decrypted data content to the registered user on the user device.

34. The method according to claim 33 wherein the method is executing in a web browser of the user device.

35. The method according to claim 33 wherein presenting the decrypted data content to the registered user on the user device comprises presenting the data content to the user directly in the web browser.

36. The method according to claim 33 wherein the decrypted data content is in a browser-viewable file format that allows for direct browser display on the user device.

37. The method according to claim 33 wherein the decrypted data content comprises a data file or files comprising electronic media content for display or playback.

38. The method according to claim 37 wherein the electronic media content comprises any one or more of the following: text, graphics, audio, and/or video.

39. The method according to claim 33 wherein the decrypted data content comprises a digital comment or comments uploaded to the server by an authorized user relating to other decrypted data content the user is authorized to access.

40. The method according to claim 39 the digital comment is in the form of any of the following: text, audio, and/or video.

41. The method according to claim 33 wherein requesting and receiving multiple items of associated encrypted data content for decryption and concurrent presentation or display.

42. The method according to claim 41 wherein the multiple items of associated encrypted data comprise an item of data content comprising electronic media content and one or more items of uploaded digital comments associated or linked to the electronic media content.

43. An electronic user device configured to provide access to shared collaborative data by a registered user in an online collaboration system, the collaboration system comprising a server and one or more electronic user devices that are capable of data communication with the server over a data network, each registered user being allocated a unique asymmetric key pair comprising a user public key and a user private key for encryption and decryption, the electronic user device comprising one or more processors configured to:

receive from the server over the data network and store in temporary memory on the user device the registered user's encrypted user private key, user public key, and a server public key;

decrypt the encrypted user private key using a password input by the registered user into the user device and store the decrypted user private key in temporary memory;

request and receive an item of encrypted data from the sever over the data network in response to user interaction with the user device, the registered user being authorised to access the item of encrypted data, the encrypted data comprising:

encrypted data content generated by symmetric encryption of the data content with a data key, and an associated enveloped data key comprising encrypted versions of the data key generated by asymmetric encryption of the data key with each of the user public keys of authorized registered users that have been granted access to the item of encrypted data content and a server public key respectively;

decrypt the enveloped data key with the decrypted user private key;

decrypt the encrypted data content with the decrypted data key; and present the decrypted data content to the registered user on the user device.

44. The electronic user device according to claim 43 wherein the one or more processors operate in response to an application executing in a web browser of the user device.

45. The electronic user device according to claim 43 wherein the one or more processors are configured to present the decrypted data content to the registered user on the user device by presenting the data content to the user directly in the web browser.

46. The electronic user device according to claim 43 wherein the decrypted data content is in a browser-viewable file format that allows for direct browser display on the user device.

47. The electronic user device according to claim 43 wherein the decrypted data content comprises a data file or files comprising electronic media content for display or playback.

48. The electronic user device according to claim 47 wherein the electronic media content comprises any one or more of the following: text, graphics, audio, and/or video.

49. The electronic user device according to claim 43 wherein the decrypted data content comprises a digital comment or comments uploaded to the server by an authorized user relating to other decrypted data content the user is authorized to access.

50. The electronic user device according to claim 49 the digital comment is in the form of any of the following: text, audio, and/or video.

51. The electronic user device according to claim 43 wherein the one or more processors are configure to request and receive multiple items of associated encrypted data content for decryption and concurrent presentation or display, in response to user interaction with the user device.

52. The method according to claim 51 wherein the multiple items of associated encrypted data comprise an item of data content comprising electronic media content and one or more items of uploaded digital comments associated or linked to the electronic media content.

53. A method of uploading data file for sharing by a registered user in an online collaboration system, the collaboration system comprising a server and one or more electronic user devices that are capable of data communication with the server over a data network, each registered user being allocated a unique asymmetric key pair comprising a user public key and a user private key for encryption and decryption, the method executed by a processor of the electronic user device comprising:

receiving from the server over the data network and storing in temporary memory on the user device the registered user's encrypted user private key, user public key, and a server public key;

decrypting the encrypted user private key using a password input by the registered user into the user device and store the decrypted user private key in temporary memory;

retrieving a selected data file for uploading in response to user interaction with the user device;

generating a random data key;

symmetrically encrypting the selected data file with the generated data key;

generating an enveloped data key comprising asymmetrically encrypted versions of the data key generated using the user public key and server public key from memory respectively; and transmitting the encrypted data file and enveloped data key to the server for storage over the data network.

54. The method according to claim 53 further comprising, in response to user interaction, transmitting data to the server indicative of other selected registered users that are authorised to access the uploaded data file so that the server can modify the enveloped data key to also include versions of the data key that are asymmetrically encrypted with the user public keys of the other selected authorised registered users to thereby enable future access to the data file by such authorised users.

55. An electronic user device configured to enable uploading data file for sharing by a registered user in an online collaboration system, the collaboration system comprising a server and one or more electronic user devices that are capable of data communication with the server over a data network, each registered user being allocated a unique asymmetric key pair comprising a user public key and a user private key for encryption and decryption, the electronic user device comprising one or more processors configured to:

receive from the server over the data network and storing in temporary memory on the user device the registered user's encrypted user private key, user public key, and a server public key;

decrypt the encrypted user private key using a password input by the registered user into the user device and store the decrypted user private key in temporary memory;

retrieve a selected data file for uploading in response to user interaction with the user device;

generate a random data key;

symmetrically encrypt the selected data file with the generated data key;

generate an enveloped data key comprising asymmetrically encrypted versions of the data key generated using the user public key and server public key from memory respectively; and transmit the encrypted data file and enveloped data key over the data network to the server for processing and storage.

56. The electronic user device according to claim 55 wherein the one or more processors are further configured to, in response to user interaction, transmit data to the server indicative of other selected registered users that are authorised to access the uploaded data file so that the server can modify the enveloped data key to also include versions of the data key that are asymmetrically encrypted with the user public keys of the other selected authorised registered users to thereby enable future access to the data file by such authorised users.

* * * * *